(12) United States Patent
Shima et al.

(10) Patent No.: US 6,381,507 B1
(45) Date of Patent: Apr. 30, 2002

(54) COMMAND PASS-THROUGH FUNCTIONALITY IN PANEL SUBUNIT

(75) Inventors: Hisato Shima, Tokyo (JP); Atsushi Suzuki, San Diego, CA (US); Takuya Nishimura, Kanagawa-ken (JP)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 48 days.

(21) Appl. No.: 09/585,706

(22) Filed: May 31, 2000

Related U.S. Application Data

(63) Continuation-in-part of application No. 09/108,265, filed on Jul. 1, 1998, now Pat. No. 6,148,241.
(60) Provisional application No. 60/145,628, filed on Jul. 26, 1999.

(51) Int. Cl.[7] .............................................. G05B 19/00
(52) U.S. Cl. ...................................................... 700/83
(58) Field of Search ........................ 700/11, 17, 83–85

(56) References Cited

U.S. PATENT DOCUMENTS

| | | | | |
|---|---|---|---|---|
| 5,121,477 A | * | 6/1992 | Koopmans et al. | 345/333 |
| 5,517,257 A | | 5/1996 | Dunn et al. | 348/734 |
| 5,606,664 A | | 2/1997 | Brown et al. | 375/200.01 |
| 5,657,221 A | * | 8/1997 | Warman et al. | 700/83 |
| 6,097,520 A | * | 8/2000 | Kadnier | 359/142 |

FOREIGN PATENT DOCUMENTS

| | | | | |
|---|---|---|---|---|
| EP | 0 596 594 A1 | 5/1994 | | G06K/11/18 |
| EP | 0 745 929 A1 | 12/1996 | | G06F/3/12 |
| WO | WO 96/14618 | 5/1996 | | G06F/9/44 |

* cited by examiner

Primary Examiner—Thomas M. Heckler
(74) Attorney, Agent, or Firm—Wagner Murabito & Hao LLP

(57) ABSTRACT

A command pass-through mechanism for allowing a set of pre-defined user command codes to be passed directly to the target device. By using the command pass-through mechanisms of the present invention, cumbersome control and manipulation of the user interface of the panel subunit can be avoided. In addition, according to an embodiment of the present invention, commands that are not represented as control objects on the user interface can be easily communicated to the target device. Furthermore, Command pass-through can be used to communicate the focus navigation commands to the target. In this way, additional control flexibility is provided to the panel subunit. Further, command pass-through is also useful for communicating commands from specialized keys associated with the controller, such as dedicated remote control buttons (e.g., guide key, selection up, selection down, selection right, selection left, etc.). The command pass-through mechanism of the present invention may also be used in conjunction with an exact bitmap image transfer mechanism to create a more advanced graphical user interface for the panel subunit.

29 Claims, 39 Drawing Sheets

382
| CONTROL TYPE = LCD PANEL |
| 440 |
CONTROL IMAGE = 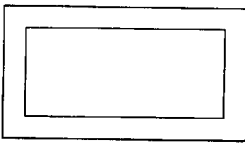 442a
442
CONTROL SIZE (IN X AND Y DIMENSIONS)
444
GROUP IDENTIFICATION
446
CONTROL POSITION IN GROUP :  448b
448a
448
VALUE RANGE SPECIFICATION:
<CHARACTER AND ICON SET(S) SUPPORTED BY THIS DISPLAY>
450
AV/C COMMAND =
FF    (NO COMMAND)
452
TARGET SUBUNIT =
FF    (NO SUBUNIT)
454
NAME = NIL
456
HELP STRING = NIL
458
FIGURE 7A

384

| CONTROL TYPE = BUTTON |
| --- |
| 460 |

CONTROL IMAGES =
PRESSED = ◸ — 462a
RELEASED = ◺ — 462b
462

CONTROL SIZE (IN X AND Y DIMENSIONS)
464

GROUP IDENTIFICATION
466

CONTROL POSITION IN GROUP : — 468b
468a
468

VALUE RANGE SPECIFICATION:
<INTEGER, 0, 1>
470

AV/C COMMAND =
$C3_{16}$ (PLAY)
472

TARGET SUBUNIT =
(VCR SUBUNIT TYPE AND ID)
474

NAME = "PLAY"
476

HELP STRING = NIL
478

FIGURE 7B

| operation_id | user operation | operation_id | user operation |
|---|---|---|---|
| $00_{16}$ | select | $30_{16}$ | forward |
| $01_{16}$ | up | $31_{16}$ | backward |
| $02_{16}$ | down | $32_{16}$ | previous contents |
| $03_{16}$ | left | $33_{16}$ | sound select |
| $04_{16}$ | right | $34_{16}$ | input select |
| $05_{16}$ | right-up | $35_{16}$ | display information |
| $06_{16}$ | right-down | $36_{16}$ | help |
| $07_{16}$ | left-up | $37_{16}$ | page up |
| $08_{16}$ | left-down | $38_{16}$ | page down |
| $09_{16}$ | root menu | : | reserved |
| $0A_{16}$ | setup menu | : | : |
| $0B_{16}$ | contents menu | $3F_{16}$ | power |
| $0C_{16}$ | favorite menu | $40_{16}$ | volume up |
| $0D_{16}$ | exit | $41_{16}$ | volume down |
| : | reserved | $42_{16}$ | mute |
| $1F_{16}$ | : | $43_{16}$ | play |
| $20_{16}$ | 0 | $44_{16}$ | stop |
| $21_{16}$ | 1 | $45_{16}$ | pause |
| $22_{16}$ | 2 | $46_{16}$ | record |
| $23_{16}$ | 3 | $47_{16}$ | rewind |
| $24_{16}$ | 4 | $48_{16}$ | fast forward |
| $25_{16}$ | 5 | $49_{16}$ | eject |
| $26_{16}$ | 6 | $4A_{16}$ | reserved |
| $27_{16}$ | 7 | $4B_{16}$ | : |
| $28_{16}$ | 8 | : | : |
| $29_{16}$ | 9 | : | : |
| $2A_{16}$ | dot | : | : |
| $2B_{16}$ | enter | $7D_{16}$ | : |
| : | reserved | $7E_{16}$ | vendor unique |
| $2F_{16}$ | : | $7F_{16}$ | Reserved |

FIGURE 23

| Address | Operation_data (operation_id = $7E_{16}$) | |
|---|---|---|
| | Contents | |
| $00\ 00_{16}$ | company id | |
| $00\ 01_{16}$ | | |
| $00\ 02_{16}$ | vendor dependent information | |
| $00\ 03_{16}$ | | |
| ⋮ | | |

FIGURE 24

| | | |
|---|---|---|
| A&E | LAW & ORDER | HIGHLANDER > |
| TNT | WCW WRESTLING | THE JERK > |
| TBS | 877 NATL GEO EXPLORER | AMERICAN... > |
| CNN | LARRY KING / SPORTS | CROSSFIRE > |
| HBO | TOMMY BOY | MAJOR... > |

| | | |
|---|---|---|
| A&E | LAW & ORDER | HIGHLANDER > |
| TNT | WCW WRESTING | *THE JERK* > 886 |
| TBS | NATL GEO EXPLORER | AMERICAN... > |
| CNN | LARRY KING \| SPORTS | CROSSFIRE > |
| HBO | TOMMY BOY | MAJOR... > |

COMMAND PASS-THROUGH FUNCTIONALITY IN PANEL SUBUNIT

RELATED CASES

The instant application is a continuation-in-part application of U.S. patent application Ser. No. 09/108,265, entitled "A METHOD AND SYSTEM FOR PROVIDING A USER INTERFACE FOR A NETWORKED DEVICE USING PANEL SUBUNIT DESCRIPTOR" by Ludtke, Kawamura and Shima, filed on Jul. 1, 1998, now U.S. Pat. No. 6,148, 241, and assigned to the present assignee, and which is hereby incorporated by reference. The instant application also claims the priority of U.S. Provisional Application Serial No. 60/145,628, entitled "COMMAND PASS-THROUGH FUNCTIONALITY IN PANEL SUBUNIT," filed on Jul. 26,1999.

BACKGROUND OF THE INVENTION

1. Field of the Invention

The present invention relates to the field of consumer electronic devices. More specifically, the present invention relates to methods and systems for providing user interfaces for networked electronic devices including remote devices.

2. Related Art

The typical home entertainment system today consists of a variety of different consumer electronic devices which present and record audio/visual media in different ways. In the field of media devices, there is a spectrum of features for products of a given class (VCRs, video camera, etc.). Most of the features are represented by physical controls or elements on a control panel on the device which can be manipulated by a human user.

Recently, a class of consumer electronic media devices has been introduced that can be networked together using a standard communication protocol layer (e.g., IEEE 1394 communication standard). The IEEE 1394 standard is an international standard for implementing an inexpensive high-speed serial bus architecture which supports both asynchronous and isochronous format data transfers. The IEEE 1394 standard provides a high-speed serial bus for interconnecting digital devices thereby providing universal input/output connection. The IEEE 1394 standard defines a digital interface for applications thereby eliminating the need for an application to covert digital data to an analog form before it is transmitted across the bus. Correspondingly, a receiving application will receive digital data from the bus, not always analog data and will therefore not be required to convert analog data to digital form. The IEEE 1394 is ideal for consumer electronics communication in part because devices can be added to or removed from the serial bus while the bus is active. If a device is so added or removed, the bus automatically reconfigures itself for transmitting data between the then existing devices. Each device on the bus is a "node" and contains its own address space.

The provision of the IEEE 1394 serial communication bus for networking consumer electronic devices has introduced a powerful new platform on which device functionality and inter-operability can be built. For instance, in such a system, complex operations involving media transfers, media recordings and media presentation can be performed that involve two or more devices acting in concert. However, interaction between these devices can be complex, error prone and laborious if it is required that each device be directly touched in order to properly configure the desired operation. The problems associated with properly configuring the media operation can be exacerbated if one or more of the devices are remotely located and/or need constant attention and or adjustment. What is needed is an effective mechanism for interfacing with networked consumer electronic devices to facilitate media operations between two or more devices.

In addition, it is often desired to provide remote control access to the features performed by a consumer electronic device so that these devices can be accessed from a central location within a home or office. However, not all consumer electronic devices are able to provide a sophisticated display system for remote interaction, e.g., some devices offer only a small liquid crystal display (LCD) or a small collection of light emitting diodes (LEDs) as display devices. What is needed is a mechanism for interfacing remotely with devices that provides a sophisticated level of user interaction for many devices. Also, in many consumer electronic systems, each device can have its own remote control unit. In systems having even a modest amount of devices, the user discovers that three or more different and bulky remote control devices are required to perform media operations. What is needed is a mechanism for interfacing with electronic devices that reduces the problems of having different remote control units for different devices. What is needed further is a mechanism for interfacing with electronic devices that is flexible and can adapt to new devices and device types within the consumer electronics market.

SUMMARY OF THE DISCLOSURE

In co-pending U.S. patent application Ser. No., 09/108, 265, entitled "A METHOD AND SYSTEM FOR PROVIDING A USER INTERFACE FOR A NETWORKED DEVICE USING PANEL SUBUNIT DESCRIPTOR", a method and system is disclosed for providing an effective mechanism for interfacing with networked consumer electronic devices using panel subunit. However, the methods and systems described therein require users to use the panel subunit on-screen display (OSD) and do not provide a mechanism that allows users to control the target devices via other control means. Further, the methods and systems described therein do not provide a mechanism for communicating focus navigation commands to the target device.

Accordingly, what is needed is an effective mechanism for interfacing with networked consumer electronic devices that overcomes the aforementioned limitations. What is further needed is a mechanism for controlling target devices that does not require the users to use the panel subunit OSD for communicating commands to target devices. What is also needed is a mechanism for communicating focus navigation commands to target devices.

The present invention provides a command pass-through mechanism for panel subunit. By using the command pass-through mechanisms of the present invention, cumbersome control and manipulation of the user interface of the panel subunit can be avoided. In addition, according to an embodiment of the present invention, commands that are not represented as control objects on the panel subunit on-screen display (OSD) can be easily communicated to the target device. Furthermore, focus navigation commands can also be passed to the target device. In this way, more advanced GUIs can be created. A more seamless and intuitive operation of the target device can also be achieved. These and other advantages of the present invention not specifically mentioned above will become clear within discussions of the present invention presented herein.

Embodiments of the present invention are implemented within a network of electronic devices that utilize a panel subunit to allow any compliant device (e.g., a target device) to describe the physical appearance of its controls and displays (e.g., elements) to another device (e.g., an intelligent controller) and allows the intelligent controller to trigger actions on the target device as if a user had physically manipulated the controls on the target device directly. An intelligent controller (e.g., a TV or set-top-box or both) monitors the network to discover the units coupled thereto and is programmed to locate panel subunits that are defined for a target device. The target device may be remotely located.

In general, the panel subunit then provides the intelligent controller with information for rendering a depiction of the controls and displays of the target device and this depiction can be interacted with by a user for remotely triggering actions by the target device. The panel subunit is defined such that command interpretations and image alterations are controlled by the target device thereby reducing the responsibility of the intelligent controller in managing the user interface with generic user events.

The panel subunit uses control objects stored in an object descriptor list to define the physical controls of the target device. The control objects are defined with several standard types of controls and displays (e.g., push buttons, sliders, dials, LCD screens, etc.) that are commonly found on consumer electronic devices. The control types have well defined behaviors (e.g., buttons are pushed, dials are moved, values are input, etc.). In addition, the panel subunit defines a set of commands which are to be applied to any of these controls when selected by the user. The commands are defined to be sufficiently generic so that they apply to most types of controls. The panel subunit also defines generic user interaction commands (or user events) which can be applied to the controls (e.g., press, press and hold, release, input value, etc.) by a user.

According to one embodiment of the present invention, the panel subunit is configured for receiving a PASS-THROUGH command code in addition to the user interaction commands (e.g., press, press and hold, release, etc.). Particularly, the PASS-THROUGH command code is not associated with any control object that may or may not be displayed on the screen of the controller. Rather, the PASS-THROUGH command code is communicated to the target device in conjunction with an action identifier that indicates a pre-defined user operation. The target device, upon receiving the PASS-THROUGH command code and the associated action identifier, maps the action identifier to a pre-defined target command. Significantly, because the PASS-THROUGH command codes are not associated with any particular control objects, special commands (e.g., commands that are not represented by control objects on the panel subunit user interface) may be communicated to the target. In this way, additional control flexibility is provided to the panel subunit. Further, command pass-through is also useful for communicating commands from specialized keys associated with the controller, such as dedicated remote control buttons (e.g., guide key, channel up, channel down, etc.).

Command pass-through can be used to communicate the focus navigation commands to the target. In one embodiment of the present invention, focus navigation commands (e.g., UP/DOWN/LEFT/RIGHT, etc.) are defined as user operations. Further, each focus navigation command is assigned an action identifier. When such command keys are pressed by the user, a PASS-THROUGH command code and the appropriate action identifier are communicated to the target device. The target device would then be able to update the user interface of the panel subunit accordingly. More particularly, the target device would be able to transfer an exact image of the user interface to the controller device to be displayed. By transferring an exact bitmap of what is to be displayed, the target device can guarantee that the display rendered by the controller will not be modified or altered. This is useful in cases where the display represents an electronic program guide (EPG) or other suitable display that should be displayed with a predetermined arrangement and should not be altered by the controller. This is also useful in cases where the controller does not have a robust processing capability and therefore merely displays the exact bitmap sent by the target.

More specifically, in a network of consumer electronic products, embodiments of the present invention include a method of communicating an commands between a target device and a controller device. The method includes the steps of: (1) retrieving an action list that indicates a list of functions that are supported by the target device and storing the action list within the controller device; (2) upon receiving a user control input that is not associated with any control objects of the panel subunit, determining whether the user control input is supported by the target device by examining the action list; and (3) provided the user control input is supported by the target device, the controller device translating the user control input into the action identifier and transmitting a pass-through command in conjunction with the action identifier to the target device.

BRIEF DESCRIPTION OF THE DRAWINGS

FIGS. 7A and FIG. 7B illustrate exemplary control object descriptors in accordance with the panel subunit of the present invention.

FIG. 23 illustrates an "operation_id" list for the PASSTHROUGH command according to another embodiment of the present invention.

FIG. 24 illustrates the field format of the "operation_data" field for the PASSTHROUGH according to an embodiment of the present invention.

FIGS. 25A, 25B and 25C are three exemplary bitmap images generated by exact image transfer mechanism of the present invention in response to user navigation.

DETAILED DESCRIPTION OF THE PREFERRED EMBODIMENTS

Figure 1:
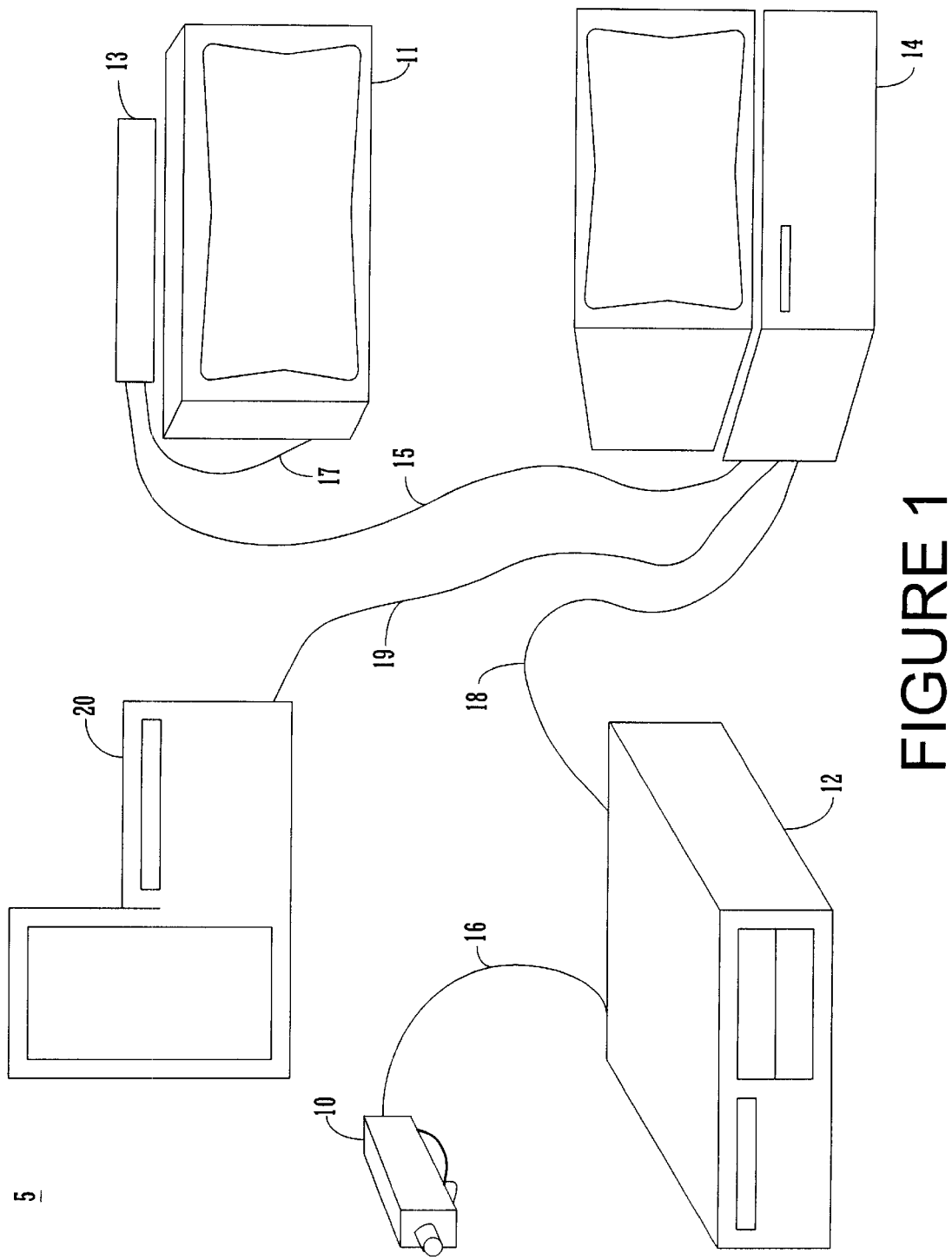
FIG. 1 illustrates an exemplary networked system of electronic devices including a video camera, a video cassette recorder, a computer, a set-top-box, a television and a compact disk changer.

In the following detailed description of the present invention, command pass through mechanism for use with a panel subunit for remotely interfacing with a target device via an intelligent controller within a network of consumer electronic devices, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Embodiments of the present invention are drawn to a panel subunit that allows any compliant device (e.g., "target device") to describe its physical appearance including controls and displays, etc., to an outside intelligent controller device. The target device can be remote to the intelligent controller. The intelligent controller then generates a user interface for the target device including: 1) interactive controls; and 2) user display information pertinent to the target device. The panel subunit allows the intelligent controller to trigger actions on the target device as if a user had physically manipulated the controls of the target device. The intelligent controller and the target device are connected to the same communication network (e.g., using the IEEE 1394 serial standard). The present invention can also be used in one embodiment to promote high levels of inter-operability between any of the devices which support the well known AV/C command and control protocol.

Generally, the present invention allows an intelligent controller to communicate with the panel subunit of the target device and inquire about the various types of controls which it has, e.g., buttons, sliders, etc. The intelligent controller then generates, on its display, a human interface based on these control object descriptions, and when the user manipulates this human interface, the controller sends special user events to the target device. The information that is capable of being displayed by the intelligent controller can be made scaleable by the target device so that the human interface displayed can adapt to the particular display capabilities of the intelligent controller device. The intelligent controller monitors the target device to maintain the most current status presented to the user.

Thus, the intelligent controller does not need to have advance knowledge of any specific features in the target device or how they are used or invoked because this functionality is the responsibility of the target device. All issues such as state transitions and inter-control dependencies are handled automatically the by target device independently of the intelligent controller responsibility. The present invention removes all requirements for items such as state transition tables and their execution environment, because it takes advantage of the functionality that is already built into a media device and used to handle the physical buttons as they are manipulated by the user. For instance, when the intelligent controller asks the target to "simulate the press of button 5," the intelligent controller does not need to have any knowledge at all about what is happening within the target device upon being notified of the user action. The state transition logic for what happens when "button 5" is pressed is all contained within the target device. This is advantageous because it enhances the inter-operability between the intelligent controller and the target device while at the same time greatly reduces the responsibilities of each.

In addition to describing physical controls and appearances, the present invention can be used to describe logical controls and appearances of elements of a logical control panel. For instance, a logical control panel can be used to control a "black box" not having any physical controls but having only a 1394 connector with the black box being located in a closet or other remote location. In this case, the black box is manipulated with on screen controls via its panel subunit thereby having no physical control panel itself.

NETWORK ENVIRONMENT OF THE PRESENT INVENTION

FIG. 1 illustrates an exemplary network system 5 that can support the embodiments of the panel subunit of the present invention. Exemplary system 5 includes consumer electronic devices (including computer systems) as nodes but could be extended equally well to cover other electronic devices. System 5 includes a video camera 10, a video cassette recorder (VCR) 12, a computer system 14, a settop-box (STB) 13, a television set (TV) 11 and a compact disk (CD) changer 20 connected together with the network by IEEE 1394–1995 (IEEE 1394) cables 15, 16, 18 and 19. It is appreciated that the panel subunit embodiments of the present invention are equally well suited for application with any bus structure and the IEEE 1394 bus structure is shown and described herein as an example bus architecture only. The STB 13 can be coupled to receive media from a cable TV system. The IEEE 1394 cable 16 couples the video camera 10 to the VCR 12 allowing the video camera 10 to send data, commands and parameters to the VCR 12 for recording (or to any other device of the network 5). The IEEE 1394 cable 18 couples the VCR 12 to the computer system 14 allowing the VCR 12 to send data, commands and parameters to the computer system 14 for display (or to any other device of the network 5).

The IEEE 1394 cable 15 couples the STB 13 to the computer system 14. The STB 13 is also coupled to the TV 11 by the cable 17. The CD changer 20 is coupled to the computer system 14 by the IEEE 1394 cable 19. The configuration 5 illustrated in FIG. 1 is exemplary only and it should be apparent that an audio/video network in accordance with the present invention could include many different combinations of components. The devices within an IEEE 1394 network 5 are autonomous devices, meaning that in an IEEE 1394 network, in which a computer is one of the devices, there is no true master-slave relationship between the computer system 14 and the other devices. In fact, as described below in an exemplary embodiment of the panel subunit of the present invention, the intelligent controller is the STB 13. In many IEEE 1394 network configurations, a computer system 14 may not be present. Even in such configurations, the devices within the network are fully capable of interacting with each other on a peer-to-peer basis. It should be recognized that data, commands and parameters can be sent between all of the devices within the IEEE 1394 network 5.

The IEEE 1394 serial bus used by system 5 of FIG. 1 is a high-speed bus architecture for interconnecting digital devices thereby providing a universal input/output connection. The IEEE 1394 standard defines a digital interface for the applications thereby eliminating the need for an application to covert digital data to analog data before it is transmitted across the bus. Correspondingly, a receiving application receives digital data from the bus, not analog data, and therefore is not required to covert analog data to digital data. The cable required by the IEEE 1394 standard is very thin in size compared to other bulkier cables used to connect such devices. Devices can be added and removed from an IEEE 1394 bus while the bus is active. If a device is so added or removed, the bus automatically reconfigures itself for transmitting data between the then existing nodes. A node is considered a logical entity having a unique address on the bus structure. Each node provides an identification ROM, a standardized set of control registers and its own address space.

The IEEE 1394 communication standard within system 5 of FIG. 1 supports isochronous data transfers of digital encoded information. Isochronous data transfers are real-time transfers which take place such that the time intervals between significant instances have the same duration at both the transmitting and receiving applications. Each packet of data transferred isochronously is transferred in its own time period. An example of an application for the transfer of data isochronously is from a VCR 12 to TV 11 of FIG. 1. The VCR 12 records images and sounds and saves the data in discrete packets. The VCR 12 then transfers each packet, representing the images and sounds recorded over a limited time period, during that time period, for display by the TV 11. The IEEE 1394 standard bus architecture provides multiple channels for isochronous data transfers between applications. Specifically, a six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

INTELLIGENT CONTROLLER

User interface aspects of the panel subunit of the present invention are implemented within an intelligent controller device. The intelligent controller can be any device coupled within a networked system (e.g., system 5 of FIG. 1) designated by the user and having certain basic input functionality and basic display capability. In one embodiment of the present invention, the STB 13 and the TV 11 act as the intelligent controller. In other embodiments, the computer system 14 can act as the intelligent controller or the TV 11 can act alone as an intelligent controller. Any device having "display" and input capability can act as the intelligent controller, e.g., a personal digital assistant (PDA), a hand-held electronic device, a cell phone, etc.). Within the context of the present invention, the intelligent controller is the device that provides a user interface for controlling events on another, remote, target device within the network 5. To this extent, the intelligent controller communicates with a display device and an information input device. The display and input capabilities of the intelligent controller device define the type of user interface that the intelligent controller can provide to a user and the panel subunit of the present invention allows the definition of scaleable user interface capabilities.

Figure 2:
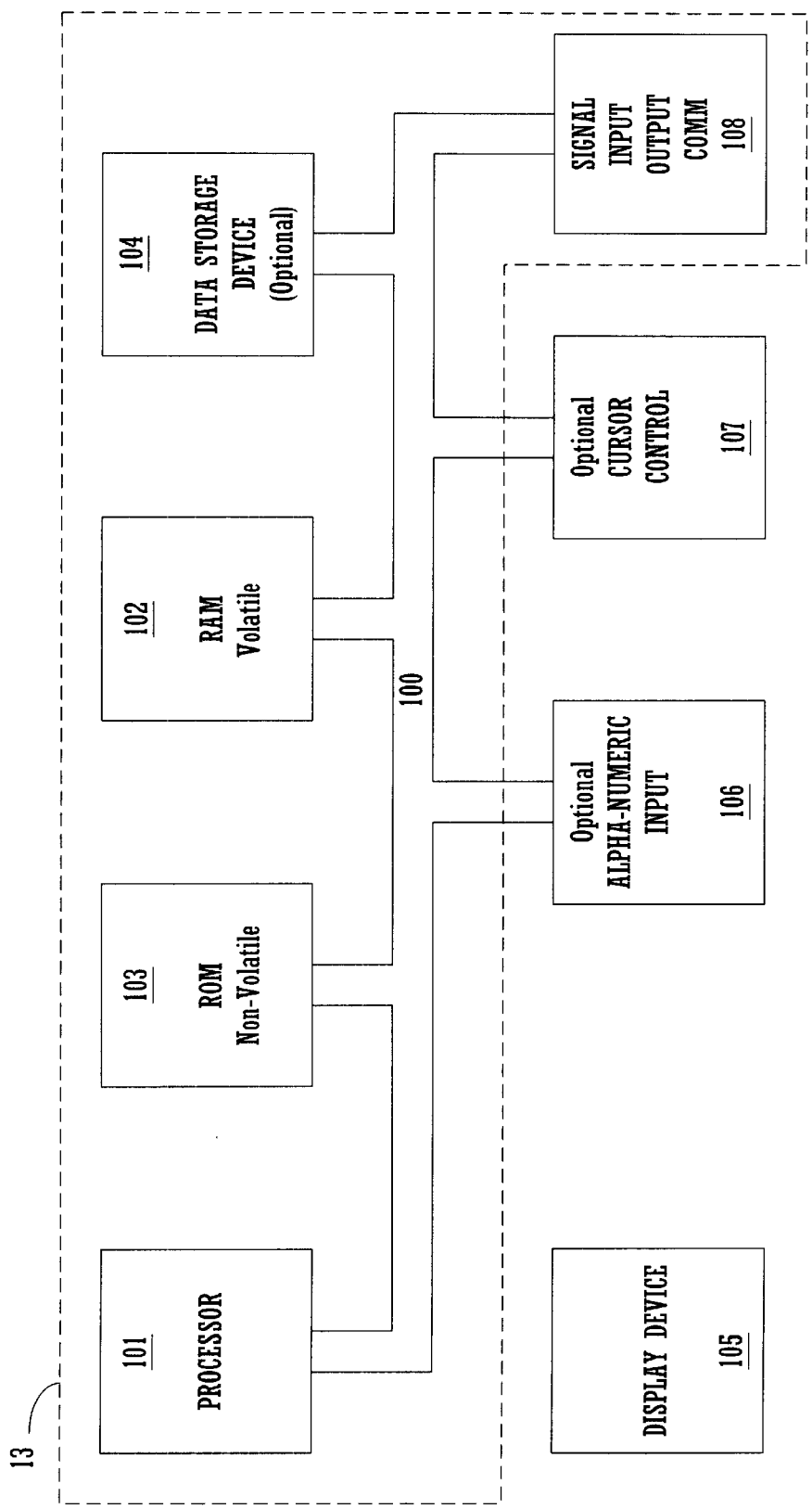
FIG. 2 illustrates components of an intelligent controller in accordance with the present invention.

FIG. 2 illustrates the components of the intelligent controller, and in this example it is the STB 13. STB 13 includes an address/data bus 100 for communicating information, a central processor 101 coupled with the bus 100 for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. STB 13 can also optionally include a data storage device 104 ("disk subsystem") such as a magnetic or optical disk and disk drive coupled with the bus 100 for storing information and instructions. In one embodiment, the display device 105 can be part of the intelligent controller. As shown in FIG. 2, the display device (e.g.,. TV 11) is external to the STB 13. When incorporated into the intelligent controller, the display device 105 can be a display screen (e.g., flat panel or CRT, etc.) or it can be a liquid crystal display (LCD) panel or other suitable display device for the display of alphanumeric and/or graphic information.

The intelligent controller 13 also interfaces with or includes one or more user input devices. In one embodiment, the input device can be an alphanumeric input device 106 including alphanumeric and function keys coupled to the bus 100 for communicating information and command selections to the central processor 101. Alternatively, or in addition, the intelligent controller 13 can interface with or include a cursor control or cursor directing device 107 coupled to the bus for communicating user input information and command selections to the central processor 101. The cursor directing device 107 can be implemented using a number of well known devices such as a mouse, a track ball, a track pad, an electronic pad and stylus, an optical tracking device, a touch screen etc. In addition, the user input device can also be a remote control device, e.g., a universal remote control device having a number of buttons, dials, etc., with an infra-red signal communication capability. STB 13 can also include a signal generating device 108 coupled to the bus 100 for interfacing with other networked devices over the IEEE 1394 bus.

The target device of the present invention can also include one or more components as described with respect to-Figure 2. Particularly, the target device in accordance with the present invention includes computer readable memory units which can include one or more ROM and/or RAM units for storing panel subunit information of the present invention which are described below.

PANEL SUBUNIT OF THE PRESENT INVENTION

The present invention defines a subunit type called a "panel" subunit. The panel subunit is defined for a target device and outlines characteristics for generating a user interface on an intelligent controller device (e.g., STB 13) of a network system 5. The panel subunits can be defined for multiple target devices and therefore many panel subunits can be included within a network system 5. For a particular target device, its panel subunit can be stored as a data structure within computer readable memory units of the particular target device.

Figure 3A:
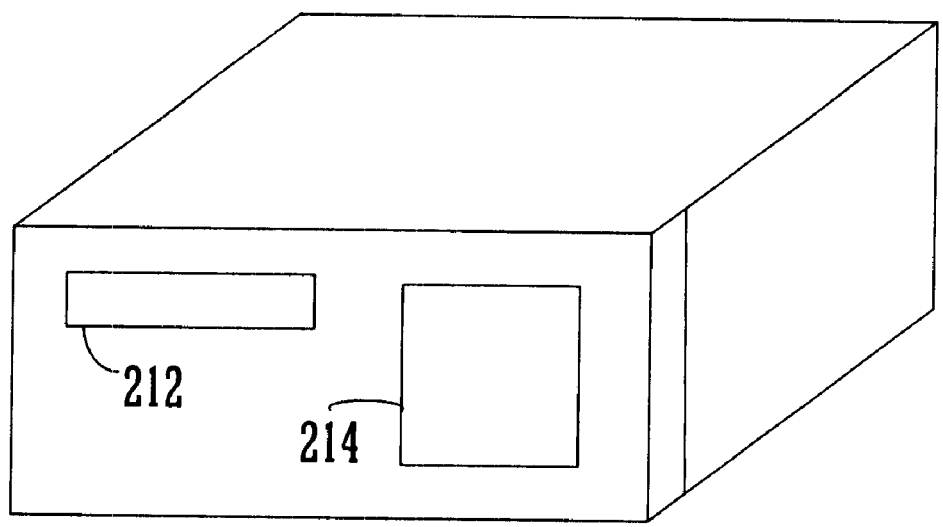
FIG. 3A is a perspective view of a target device having panel display elements and panel control elements.

FIG. 3A illustrates a perspective view of the VCR 12 of FIG. 1 as an exemplary target device. Although, generally, any electronic device can have its own panel subunit and thereby be a "target device," the following discussion illustrates an exemplary case where the VCR 12 is the target device. VCR 12 contains a video tape slot 212 for insertion and removal of video tape media. The VCR 12 also contains one or more liquid crystal displays (LCDs) 214.

Figure 3B:
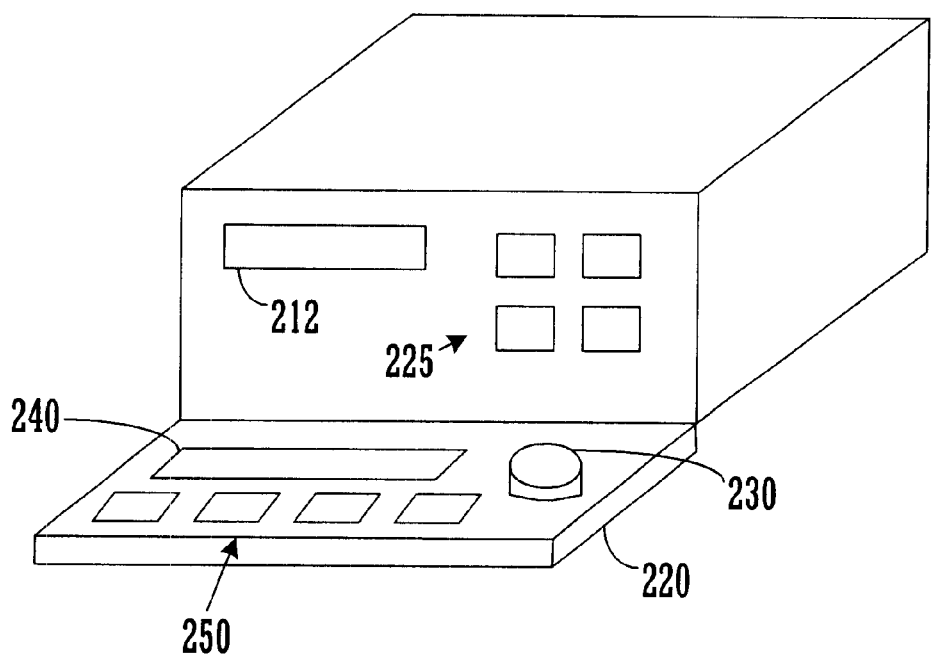
FIG. 3B is a perspective view of the target device of FIG. 3A having a front panel in the flipped-open state to expose more control and display elements.

FIG. 3B illustrates the VCR 12 with a control panel 220 flipped-down exposing certain controls and further displays (e.g., "elements"). The control panel 220 contains another LCD display 240 and includes a scrubber control 230 or "dial." The control panel 220 also contains certain tape transport controls 250 (including play, pause, stop, rewind, fast-forward, buttons etc.). When the control panel 220 is flipped down, it exposes tuner preset buttons 225. In the present invention, devices can have more than one logical control panel. In this configuration, the VCR 12 has two logical subpanels. The first subpanel includes the controls and display of the flip-down control panel 220 and the second subpanel includes the tape slot 212 and the tuner preset buttons 225. Another subpanel could define the LCD panel 214.

Figure 4:
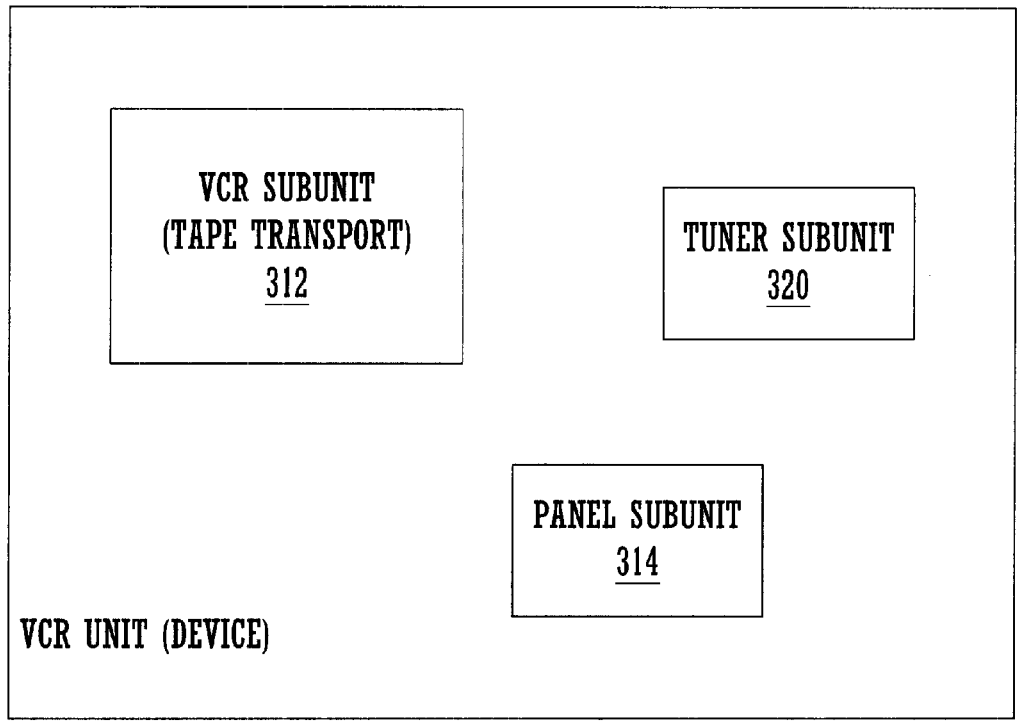
FIG. 4 illustrates a logical block diagram of the subunits located within a target device (a VCR) including the panel subunit of the present invention.

FIG. 4 illustrates a logical block diagram of some of the subunits that can be associated with VCR 12 in accordance with the present invention. Within the well known AV/C protocol, subunits are logical, not physical, groupings of functionality that can be individually addressed and controlled within a device. For example, a VCR device 12 can have two subunits, one subunit 312 for the actual VCR tape transport mechanism, and another subunit 320 for the tuning functionality. The panel subunit 314 of the present invention adds a novel logical subunit that can be associated with the VCR device 12. As described further below, the panel subunit 314 of the present invention is realized, in one embodiment, as one or more data structures stored in computer readable memory units of the target device e.g., the VCR unit 12. It is possible for a panel subunit for a first device (e.g., of limited memory capacity) to exist on a second device (having more memory), whereby the second device acts as a proxy for the first device's panel subunit.

The panel subunit 314 is a collection of data structures called "descriptors" that describe the physical controls on the target device (e.g., the control panel). In operation, the intelligent controller (e.g., STB 13) accesses the panel subunit 314 of the target device, and based thereon, implements a user interface for using the target device (e.g., the VCR 12). The user interface involves the display (e.g., TV 11) and user input devices associated with the intelligent controller, as described with respect to FIG. 2. The specification for the panel subunit 314 defines several standard types of controls and displays that are commonly found on consumer electronic devices, such as push buttons, sliders, dials, LCD screens, etc. As an example, the descriptions within the panel subunit 314 for VCR 12 could represent the buttons, dial and LCD screens of FIG. 3A and FIG. 3B.

The control types defined by the panel subunit 314 have well defined behaviors. For instance, buttons are pushed and released and typically have two values, sliders may have several discrete values or a continuous range of values. Further, some standard control types may be combined within the descriptors to form hybrid or custom controls. One example of this is a dial with a push button in the middle or a button with an LED in the middle. Such composite control mechanisms are supported by the panel subunit of the present invention. Finally, vendor specific custom controls may also be defined.

In addition to standard control types, the panel subunit 314 of the present invention also defines a set of commands which may be applied to any of these controls. The commands are defined to be sufficiently generic so that they apply to most types of controls. For example, issuing the command SET CONTROL VALUE (control 1, 6) by the intelligent controller may cause a volume slider to be set to the value 6, representing a change in volume. Likewise, the same command type with different operands can be issued as SET CONTROL VALUE (control 5, "please enter the track name"), and it would cause that text to show upon the LCD display of a MiniDisc recorder 20, prompting the user to enter a name for a track on the disc. Further, within the panel subunit, some commands can be specific to certain kinds of controls.

The panel subunit 314 also defines "user interaction commands" or user events which can be applied to the controls of the user interface. The purpose of these generic user events is to encapsulate the typical user manipulation actions for controls, and to let the target device interpret what it means when these user events occur thereby freeing the intelligent controller of this responsibility. For example, many CD players 20 have multiple semantic meanings for the fast forward button on the device and these meanings are affected by the current state of the device. Consider the following:

TABLE I

| Current Device Setting | Action | Result |
|---|---|---|
| Device Is Not Playing | FF Button Pressed | Advance to the Next Track and Hold |
| Device Is Playing | FF Button Pressed | Advance to the Next Track and Continue Playing from that Point |
| Device Is Playing | FF Button Pressed and Held Down | Play in "Fast Forward" Mode |

As shown above, the actions taken by the target device vary based on its current state and what the user does with the physical controls. The panel subunit of the present invention defines several user action commands such as "PUSH,"

"PRESS AND HOLD," and "RELEASE" that are triggered by user interaction with the displayed user interface. In accordance with the present invention, the intelligent controller of the present invention has no notion of what the target device will do in response to the commands that are issued to it. All concerns regarding the state transition as shown in the Table I are handled inside of the target device. It is appreciated that the target device already needs to have this logic in place in order to process the user interaction on its physical control panel. The panel subunit of the present invention is viewed as another mechanism by which to access these logical entry points.

It is important that the intelligent controller always keep the user informed regarding the status of the target device being controlled. In one embodiment, it is possible that the intelligent controller and the user are sitting in one room of a house or business office and the target device is located in another room or office. Because the intelligent controller has no pre-defined knowledge of how to interpret the user interaction elements, it needs to have a mechanism of keeping its display updated with the most current status of the target device. It does this by making use of the status reporting mechanism that has been defined for the AV/C protocol, in one embodiment, using a status descriptor data structure and a panel status notification command in accordance with the present invention.

The status descriptor data structure is a dynamic data structure that is always kept up-to-date by the panel subunit 314 of the present invention. The intelligent controller can examine this structure at any time so that it can update its graphical display to indicate the target device status to the user. The panel status notification command of the present invention allows the intelligent controller to post a notification request to the target device. When any change in the state of the device results in a change to the status descriptor data structure, then the target device sends a notification to the intelligent controller. The intelligent controller then updates its graphical display as appropriate in response to the status information.

Figure 5:
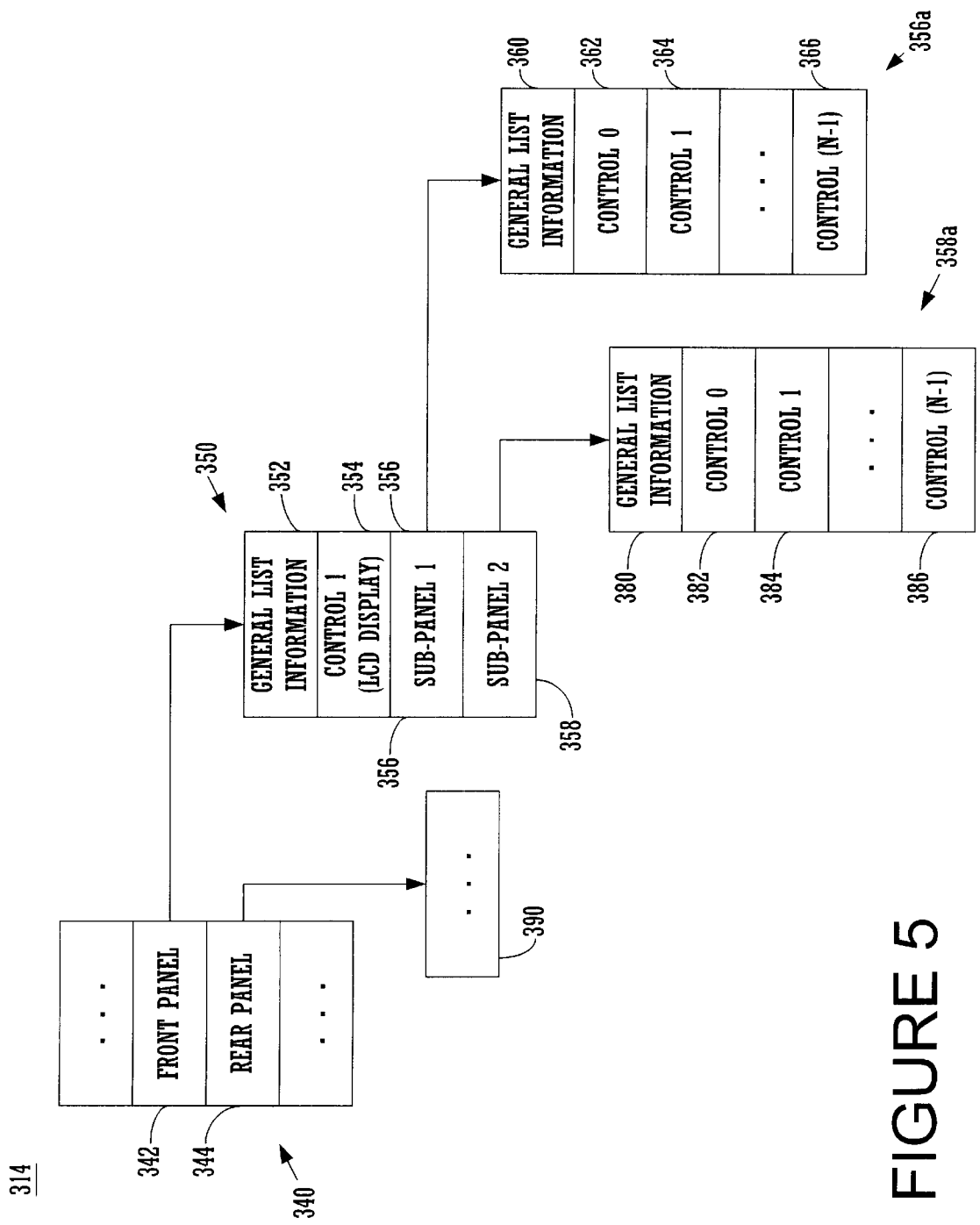
FIG. 5 illustrates descriptor information of a panel subunit in accordance with the preset invention including a subunit identifier descriptor, panel lists and object lists of control objects.

The AV/C protocol allows a device (also called a unit herein) to contain any number of subunits of the same type. Therefore, a device can have more than one panel subunit of the present invention. For instance, one panel subunit can be defined for the front panel of FIG. 3B and another panel subunit can be defined for the flip-down panel 220. Other panel subunits can be defined for the side and back panels, if any. Alternatively, a single panel subunit can be defined to encompass several controls as shown in FIG. 5. In this approach, a single panel subunit can contain any number of control lists which are hierarchically ordered. Each control list of the present invention represents a control panel of the target device. All of these lists are accessed via the single panel subunit 314.

Part of the panel subunit data structures includes geometry information describing the layout image and orientation of panels and controls so that they can be represented to the user in a manner similar to their physical appearance on the target device or in a manner "suggested" by the target device. As standard controls can be combined into hybrid controls, this geometry information can also be defined to indicate the presence of panel hierarchies, such as panels hidden behind a front flip-down face 220 (FIG. 3B). This is commonly found in many VCR devices where some basic controls are on the face of the VCR device and the more advanced controls and features are hidden behind the flip-down front panel 220.

PANEL DESCRIPTORS OF THE PANEL SUBUNIT

FIG. 5 illustrates data descriptor information maintained by computer readable memory units of a target device, e.g., VCR 12. It is appreciated that the data descriptor data structures found in FIGS. 5–8 and 11 are all maintained and realized within computer readable memory units of the target device in accordance with the present invention. The panel subunit 314 (FIG. 4) includes a panel subunit identifier descriptor data structure 340. The identifier descriptor list 340 indicates identifiers for each of the main panel lists supported by the panel subunit 314. Each of these panel lists can contain a control object which has a child list, indicating a panel hierarchy. For instance, primary identifier list 340 relates to the front panel for the target device and includes an identifier (e.g., pointer) 342 which points to a secondary identifier structure 350 which itself includes two sub-panel descriptions (e.g., one for the face of the VCR 12 and one for the flip-down panel 220). The primary identifier 340 also includes an identifier (e.g., pointer) 344 for another secondary identifier list 390 describing a rear panel for the target device. In this manner, the main identifier and the secondary identifier structures of the panel subunit 314 can define hierarchical relationships between the descriptor list information and thereby between the panels and sub-panels themselves.

The secondary identifier descriptor list 350 of FIG. 5 is a descriptor list including a general list information field 352 and one object control descriptor 354 for describing the LCD display 214 (FIG. 3A). A descriptor list within the present invention can include object control descriptors, general information, and pointers to child descriptor lists. Therefore, a control object within a descriptor list can point to another descriptor list indicating a parent-child relationship between the control object and the indicated descriptor list. Descriptor list 350 includes a pointer 356 indicating a child descriptor list 356a used to describe "sub-panel" which is a portion of the controls of the front panel for VCR 12 in this example. Further, descriptor list 350 includes a pointer 358 indicating a child descriptor list 358a used to describe "sub-panel2" which is another portion of the controls of the front panel for VCR 12. In this example, the descriptor list 356a for sub-panel defines the controls on the face of VCR 12, e.g., buttons 225 for the tuner subunit 320. The descriptor list 358a for sub-panel2 defines the controls on the flip-down control 220 of VCR 12, e.g., buttons 250, display 240, and dial 230.

As with any descriptor list data structure, descriptor lists 356a and 358a each contain a respective general list information field 360 and field 380 and also contain respective lists of control objects. In accordance with the present invention, a list which contains control objects for a panel is used to describe the control panel itself, as well as to hold the collection of objects. Generally, information that describes the collection (the panel description) would contain the following: (1) panel identifier (e.g., front, back, left side, etc.); (2) panel layout geometry (e.g., size of panel, orientation of controls, definition of groups, etc.); (3) group descriptions for each group of controls where the following can be defined, group label, group bounding box/position within the panel, and other group related information; and (4) a name for the panel subunit. An example is shown in FIG. 6.

Figure 6:
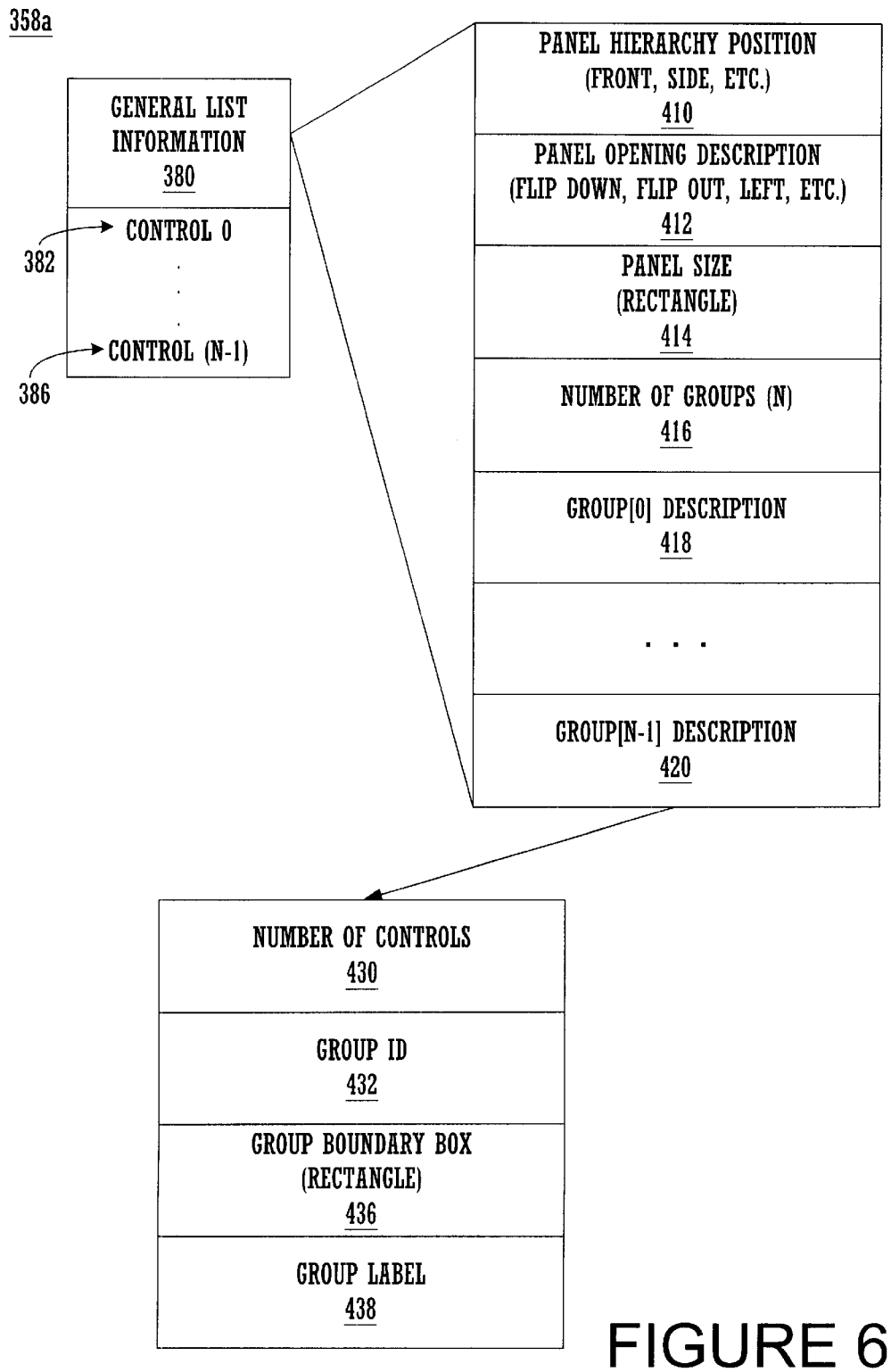
FIG. 6 illustrates the contents of the general list information structure including a group identification structure in accordance with the panel subunit of the present invention.

FIG. 6 illustrates the information included within the general list information data structure 380 of the secondary descriptor list 358a for the front sub-panel of the target device. Secondary descriptor list 358a contains general list information 380 and a collection of n objects 382 to 386. Exemplary data structure 380 includes fields 410–420. Field 410 indicates the hierarchical position or identifier for the descriptor list 358a in which the field is included. For instance, field 410 indicates which physical panel the information represented, e.g., whether this descriptor list 358a represents a front, side, rear, etc., control panel. In this example, descriptor list 358a is a "front" panel. Field 412 defines the opening or access options used to obtain access to the control panel for which descriptor list 358a is defined, e.g., flip-down, flip-up, flip-out, left, right, direct access, etc. In this case, control panel 220 (FIG. 3B) has "flip-down" style access. Field 414 defines the general size and shape of the control panel for which descriptor list 358a is defined (e.g., rectangle, circular, oblong, triangle, polygon, etc.). In this case, control panel 220 is rectangular in shape.

Fields 416–420 of FIG. 6 are used to define groups within the control panel for which descriptor list 358a is defined. Groups can be used to separate certain control features that are similar or control a similar function or feature. For instance, buttons that each relate to the control of the tape mechanism for a VCR 12 can be assigned into one group while buttons that control the channel selection or the volume selection of the VCR 12 can be assigned in a separate group. Groups have special functions within the present invention, e.g., they can be displayed spatially together on the display of the intelligent controller, and can have other defined attributes in common. Field 416 indicates the number of groups defined for descriptor list data structure 358a and fields 418–420 represent the group description information for a number of exemplary groups.

FIG. 6 illustrates fields 430–438 which represent an exemplary group description that is contained in field 420 for an exemplary group (n−1). Information field 430 includes the number of control objects that are defined for this group. Field 432 includes a group identification number or string that is unique for this group and used to identify the group by control objects. Each control object that is to be included in the defined group includes the identifier 432 in its object description (described below). Field 436 indicates the spatial boundary box in which this group is included for the control panel. This information indicates where this group exists with respect to other defined groups in the user interface layout and is used for rendering the image of the control panel on the display of the intelligent controller. Field 438 is a group label that can be used to provide access to and represent the control objects of this group for cases where the display unit of the intelligent controller is not sophisticated enough to provide images or further information. Field 438 typically contains a string or other text label that can be used, in one embodiment, as a tab index in a tabbed-panel presentation of information. In a tabbed-panel presentation, all the defined tabs for all groups are displayed along the side of the display and groups are selected for presentation by selecting one tab or another.

FIG. 7A illustrates the data of a control object 382 in accordance with the panel subunit of the present invention. Exemplary control object 382 is included within descriptor list data structure 358a. In one embodiment, the panel subunit of the present invention presents its information to controllers via the AV/C object and object list data structures. These data structures are generic containers whose contents are specialized based on the owner of the structure. A panel subunit of the present invention contains a list of its controls (e.g., list descriptor 358a), with each control being represented by a control object in the list. Within the present invention control objects can be defined to represent user input devices (e.g., buttons, sliders, toggle switches, etc.) and can also be defined to represent information displays (e.g., LCD panels, dials, etc.).

FIG. 7A illustrates the information of a control object 382 representing the LCD panel 214 of FIG. 3A. Field 440 describes the type of control object being defined. In this case it is "LCD Panel" type. Other control types for displaying information include "Display," "Dial," "CRT Display," "LED" and "Alpha/Numeric Display." Other control types for information input devices include "Button," "Slider," "Rotator," "Toggle Switch" and "Rocker Switch." Field 442 includes a graphical image of the control object. This image information is typically raster data (e.g., bit mapped) and may include color and other attribute data. In this particular instance, the control image 442a is in the shape and character of the outline of an LCD display to represent LCD panel 214. Field 442 could also contain a collection of images used for performing animation in a predefined sequence of presentation. Field 444 represents the dimensions of the image 442a and in one embodiment is represented in screen coordinates (x, y). To generalize these coordinates for application with many screen dimensions, the (x, y) values can be represented in relative terms with respect to the left corner, e.g., the (0, 0) coordinate position, of the display screen.

Field 446 of FIG. 7A represents the group identification or name with which this control object 382 is associated. Controls can be clustered into groups based on layout information defined by the panel subunit of the present invention. This field 446 is optional as an object does not necessarily need to be associated with any group at all. If a group is associated with this control object 382, then field 448 represents the relative position 448a within the group boundary 448b in which this control object 382 belongs. This information can be expressed in coordinate values. Field 450 represents the allowable or valid value ranges that can be taken by this control object in response to a user event. This field 450 can also include a data type indicator (e.g., 16-bit representing integer, floating point, etc.) In the case of a display object, field 450 represents the character or icon sets that can be displayed within the control object. In the case of a user input control object, field 450 indicates the range of possible values that can be set by this control object. If the control object was a slider, then a range of values is appropriate. If the control object is a button or toggle switch, then possibly only two states (e.g., 0 or 1) are valid for the control object.

Field 452 of FIG. 7A is optional and represents the equivalent AV/C command that occurs when the control object 382 is activated. This AV/C command can be communicated by the intelligent controller over the network within system 5 when the control object 382 is invoked. Field 452 is optional because the target device has the capacity to interpret changes in the control object as communicated to it by the intelligent controller without the need for a communicated AV/C command. The panel subunit 314 represents the VCR 12 in this example. The manipulation of those controls may cause a state change in other subunits within the target device. The values of field 454 represents which subunit (subunit type and ID) can be effected by this control object. Field 454 is likewise an optional field that indicates the identification of the target device associated with the control object. Again, this information is optionally included within the control object 382 but is maintained by the intelligent controller by virtue of which target object contained the panel subunit in the first instance.

Field 456 is an identifier or name string that can be associated with the control object. In instances where the display device of the intelligent controller is not sophisticated, field 456 can be used to at least provide a basic textual description of the control object which is presented for user interface functionality. Field 458 contains a help string that can be displayed on the display of the intelligent controller if a help feature is employed by the user. The help string describes what the control object does. This can be extended to provide a help string for each state of the control object. The help string can identify the control object and give tips on how to use the control object, its purpose and expected functionality and value range.

FIG. 7B illustrates information associated with an exemplary control object 384 for one of the push buttons of buttons 250 of the flip-down panel 220 of FIG. 3B. In this example, the "Play" button is being represented for VCR 12. Field 460 defines the control object as a "button" control type. Field 462 can contain multiple images or "icons" that can be used for displaying the control object. The icons can, for instance, represent different states of the control object, e.g., such as a button which is highlighted differently whether it is pressed or released. Field 462, in this case, contains a number of icons that represent the image of the button in different states (e.g., pressed or released). Image 462a represents the image for the button pressed and image 462b represents the image of the button for the button released. Field 464 represents the screen dimensions of the images of field 462 and field 466 represents a group identification, if any, for control object 384. In this case, all of the buttons 250 (FIG. 3B) are clustered together into a single group because they control the tape mechanism for VCR 12, e.g., Group Identification="Tape Mechanism," where this group would have to have been previously defined in a data structure of FIG. 6.

Field 468 represents the relative position 468a of the control object 384 within the group boundary 468b. In this case, the control object 384 represents the third button from the left within the collection of buttons 250. Field 470 represents the possible range of values can be represented by the button, e.g., in this case 0 to 1, and the value is an integer. If the control object was a slider, then a possible range of values (e.g., 0 to 10) could be represented with the values being integer or floating point type.

Optional field 472 represents the equivalent AV/C command for "Play" and can be communicated by the intelligent controller when control object 384 is pushed. When a user event such as PRESS is issued, it may result in the same action as if a standard AV/C command, such as the VCR subunit PLAY command, had been issued. The value of field 472 is the opcode of the equivalent AV/C command. Optional field 474 represents the network identification for the target device (in this case, the VCR subunit). Field 476 is an identifier or name string that can be associated with the control object, e.g., "Play." In instances where the display device of the intelligent controller is not sophisticated, field 476 can be used to at least provide a textual description of the control object which is presented for user interface functionality. Field 478 contains a help string that can be displayed on the display of the intelligent controller if a help feature is employed by the user, e.g., "Press Play to Start Watching A Tape in the VCR." The help string could also describe why the control object is in a particular state, e.g., "The Play Button is Disabled Because There is No Tape in the VCR."

It is appreciated that the control objects of FIG. 7A and FIG. 7B are exemplary only and that other similar control object descriptions can be used to realize a user interface for all user inputs and user displays of the VCR 12 for all control panels. It is further appreciated that each other control object of FIG. 5 can analogously be defined in accordance with the present invention.

Figure 8:
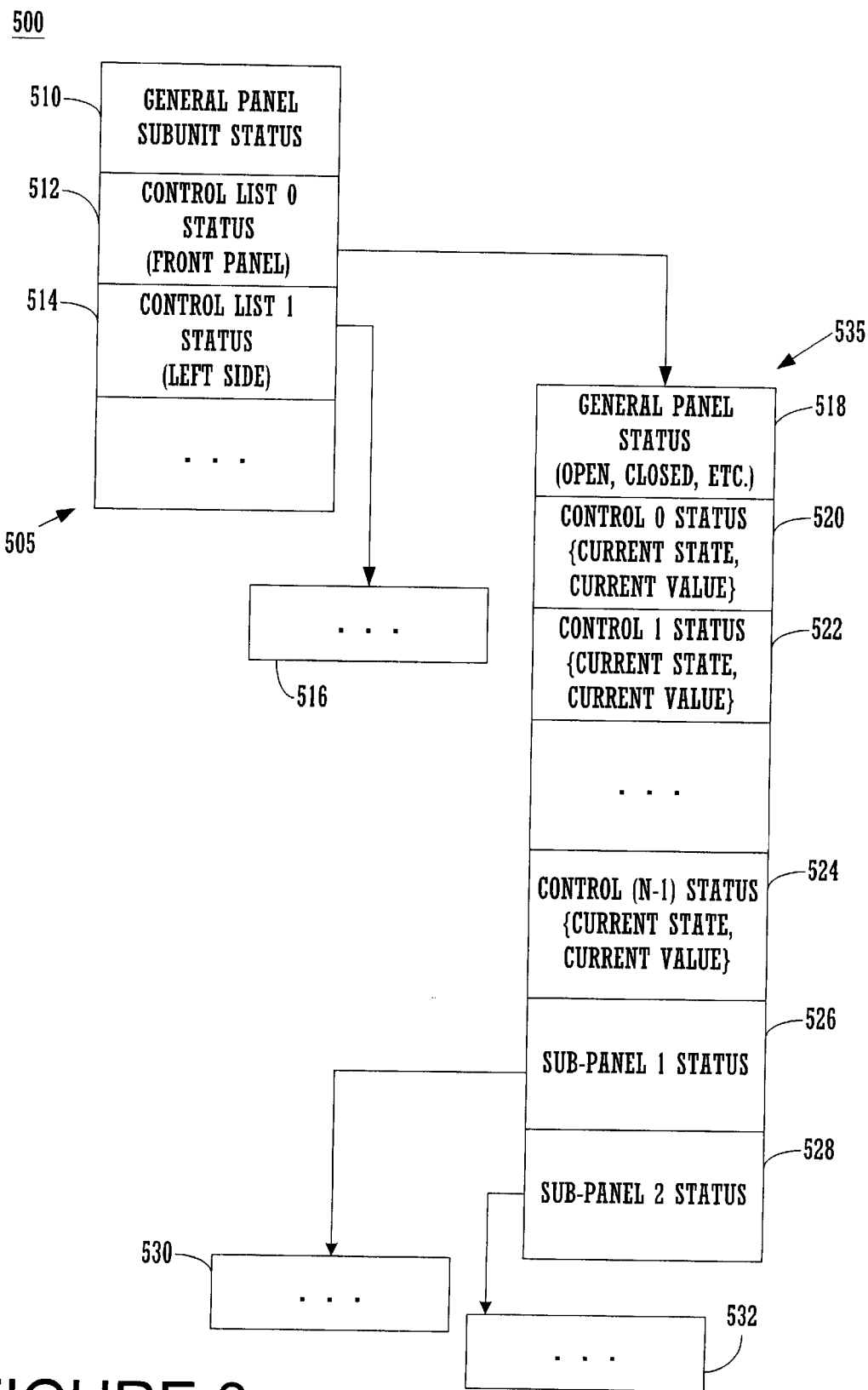
FIG. 8 illustrates a panel subunit status descriptor data structure in accordance with the present invention.

FIG. 8 illustrates a panel subunit status descriptor 500. The panel subunit 314 of the present invention also includes a panel subunit status descriptor 500 data structure. The status descriptor 500 is a data structure maintained in computer readable memory units of the target device and represents the current state of all control objects defined for a particular panel subunit in accordance with the present invention. The information maintained in the status descriptor 500 is dynamic, and is kept up-to-date by the panel subunit 314 of the present invention. Within the status descriptor 500, a separate control status field is-maintained for each defined control object. When changes occur to the status descriptor 500, a notification can be forwarded to any intelligent controller that previously indicated that it was to be notified of any changes. The overall status descriptor 500 contains two main areas, one area 510 contains general status information for the panel subunit and a separate area 512 is defined for each of the control list hierarchies. Within each of these control list areas are status information for each control. Status information includes the current state of the control object (e.g., the button is currently pressed) and the current value of the control object (e.g., the LCD panel is currently displaying the text "Enter Track Name.").

In operation, an intelligent controller can request notification for individual control lists or for the general area of the panel status descriptor 500. When the status of one of these areas changes, the intelligent controller is notified. If status for an area changes for which an intelligent controller had not requested notification, the intelligent controller is not notified. This operation allows the various controllers and target devices to optimize the use of the system network bandwidth by not sending out unnecessary messages.

Status descriptor 500 of FIG. 8 is shown as an example and includes a primary status list 505 which includes a general information field 510 for panel subunit 314 and pointers 512 and 514 to other major status lists. Pointer 512 points to status list 535 for representing the status of the front panel. Status list 535 includes a status field for each control object defined for the front panel. Pointer 514 points to the status list 516 for an exemplary left side panel. Field 518 of status list 535 indicates general status information for any control objects defined with respect to the front panel including whether or not the panel is open, closed, etc. Field 520 represents the current state/value of control object 0 defined for the front panel. Likewise, field 522 represents the current state/value of control object 1 defined for the front panel.

Field 526 is a pointer to the control list 530 indicating the states/values for the control objects defined with respect to the sub-panel of the front panel. These control objects are defined with respect to descriptor list 356a (FIG. 5). Within status list 530, a separate control status field is defined for each control object. Field 528 of control list 535 is a pointer to the control list 532 indicating the states/values for the control objects defined with respect to the sub-panel2 of the front panel. These control objects are defined with respect to descriptor list 358a (FIG. 5). Within status list 532, a separate control status field is defined for each control object.

Figure 9:
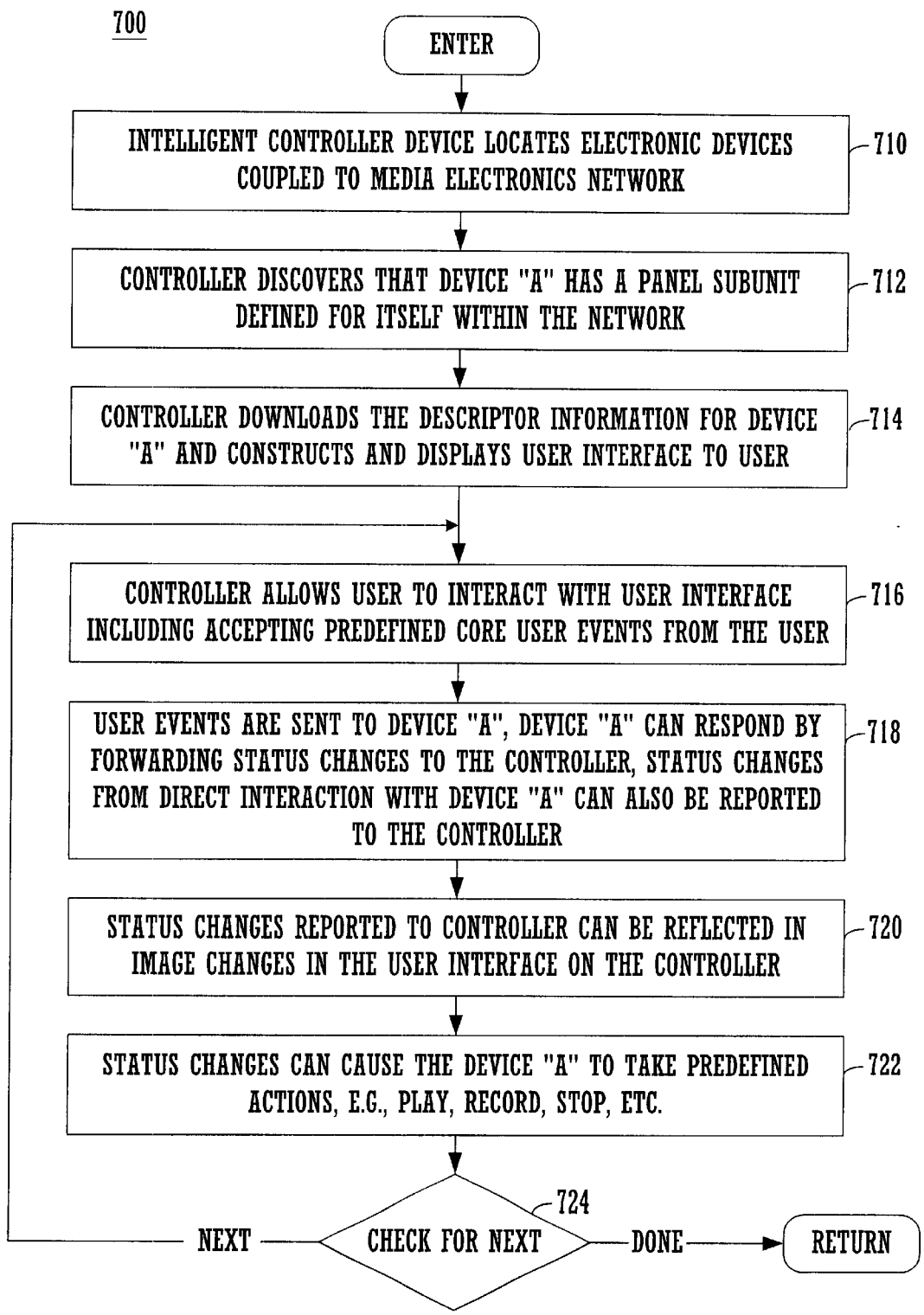
FIG. 9 is a flow diagram of steps performed by an intelligent controller in accordance with the present invention for generating a user interface.

FIG. 9 is a flow diagram illustrating steps of a process 700 implemented in accordance with the panel subunit of the present invention. Process 700 is realized as program code stored within computer readable memory units of an intelligent controller and a target device of network 5. At step 710, the intelligent controller device, e.g., STB 13 and TV 11 (used as the display unit), locates electronic devices coupled to system 5. This process utilizes well known IEEE 1394 communication protocol mechanisms. At step 712, the intelligent controller reads the computer readable memory units of a target device coupled to the network 5 and discovers that this target device has a panel subunit data structure 314 defined therein. At step 714, the intelligent controller device downloads the descriptor information and the current status descriptor table for the target device and displays a user interface on the display screen of the intelligent controller based on the downloaded information. If the intelligent controller device has limited memory resources, then the panel subunit information can be downloaded and processed in portions.

At step 714, the control objects of the panel subunit describe the look, shape, grouping and location for each user input element and each information display element for the user interface. Should the intelligent controller be limited in display capability, then text strings are displayed for the groups and/or for the control objects and these text strings can be displayed in a hierarchical format (e.g., using a tabbed-panel display).

At step 716 of FIG. 9, the intelligent controller allows the user to interact with the user interface including accepting predefined or generic user events from the user. Each control object contains an object type and each object type defines a user action that can take place with respect to the control object. For instance, buttons are "PUSHED" or "PUSHED AND HELD" or "RELEASED" and sliders and rotators can be moved to "SET A VALUE." Toggle switches can be moved between two positions, e.g., "MOVED RIGHT" or "MOVED LEFT" or "MOVED UP" or "MOVED DOWN." Other user events include setting a text value, e.g., SET TEXT VALUE, or setting a numeric value, SET VALUE, etc. These user events are defined by the control objects themselves and the intelligent controller does not interpret the meanings of these events for any target device.

At step 716, irrespective of the type of user input device, e.g., keyboard, mouse and mouse button, remote control unit, pen and stylus, light pointer, joystick, etc., the intelligent controller translates the interaction between these user input devices and the user into a generic user event core recognized by the panel subunit 314 of the present invention. For instance, a button control object can be "PRESSED" and then "RELEASED" by selecting it with a mouse or selecting it with a keyboard or with a remote control button push. In either case, the user event is "PRESSED" or "RELEASED" with respect to the control object.

At step 718 of FIG. 9, any user events detected by the intelligent controller are forwarded over the network 5 to the target device. The target device then interprets the user event and takes the appropriate action based on its programming. The programming used by the target device at step 718 is the same programming that is already present in the target device for responding to the input devices physically located on the target device. In this case, any target device having physical controls located thereon already is programmed with the required actions to take upon these controls-being directly pushed by a user. The present invention takes advantage of this pre-existing functionality within each target device. A received user event may trigger a change in one or more of the states of the control objects defined within the panel subunit of the present invention. Upon a change in state, the status descriptor 500 of the panel subunit changes thereby notifying the intelligent controller of a state change.

At step 720, the intelligent controller downloads the status descriptor to determine which control object changed states. Next, the intelligent controller updates the displayed user interface to reflect the change. For instance, if the button state changed from released to pressed, then the intelligent controller may display a new image for the button state being pushed. Alternatively, if the state of the VCR tape mechanism changes from standby to play, an image within LCD panel 214 might become animated showing the tape playing, etc. At step 722, the generic user events cause the target device to implement a certain action, e.g., play, pause, etc. It is appreciated that step 722 can occur before step 720. At step 724, processing returns to step 716 to check for a next user action.

In operation, the intelligent controller is not burdened with keeping state tables or by interpreting the meaning of the user events. These interpretations are performed by the target device thereby providing the panel subunit with a large amount of flexibility for adapting to new standards and control types. Furthermore, by providing a range of possible display representations, the present invention provides a flexible user interface for intelligent controllers having robust display capabilities and also for those controllers having unsophisticated displays. The panel subunit of the present invention defines generic user input events, core data structures which define a limited set of user actions or events and display elements and a basic communication protocol is used.

Figure 10:
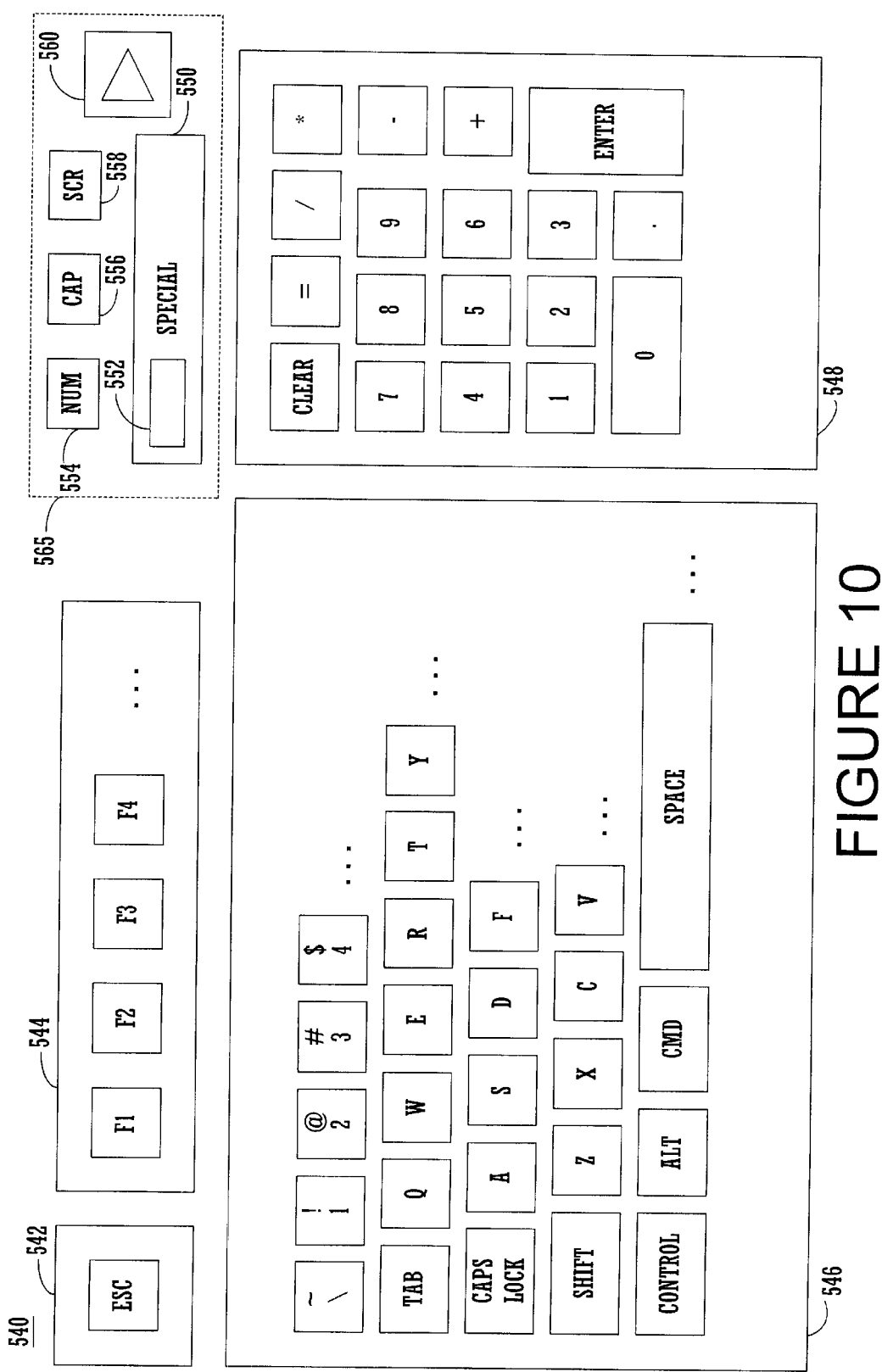
FIG. 10 illustrates an exemplary user interface displayed by the present invention based on a panel subunit and representing an on-screen keyboard.
Figure 11:
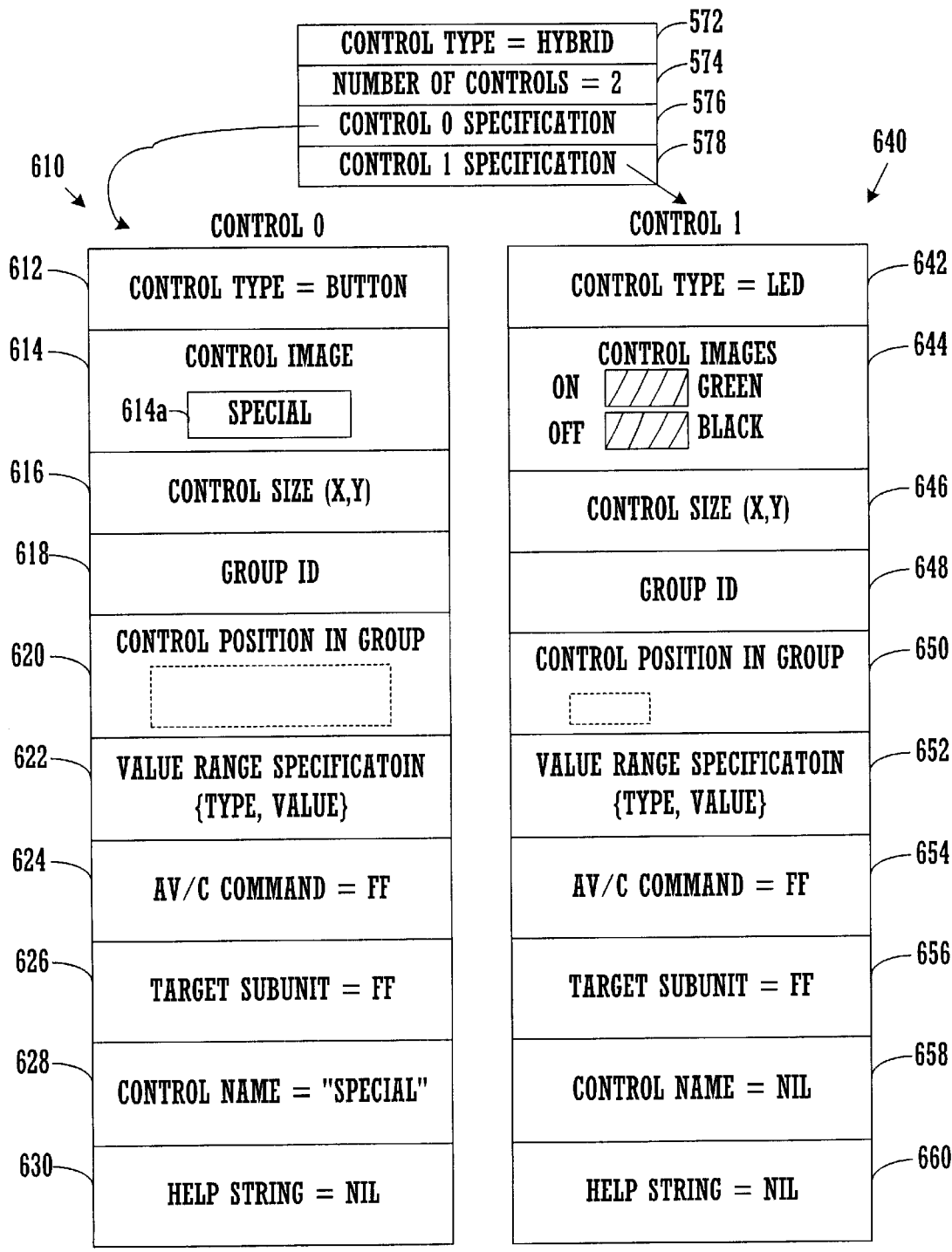
FIG. 11 illustrates exemplary panel subunit descriptor information for generating the on-screen keyboard example of FIG. 10 in accordance with the present invention.
Figure 12:
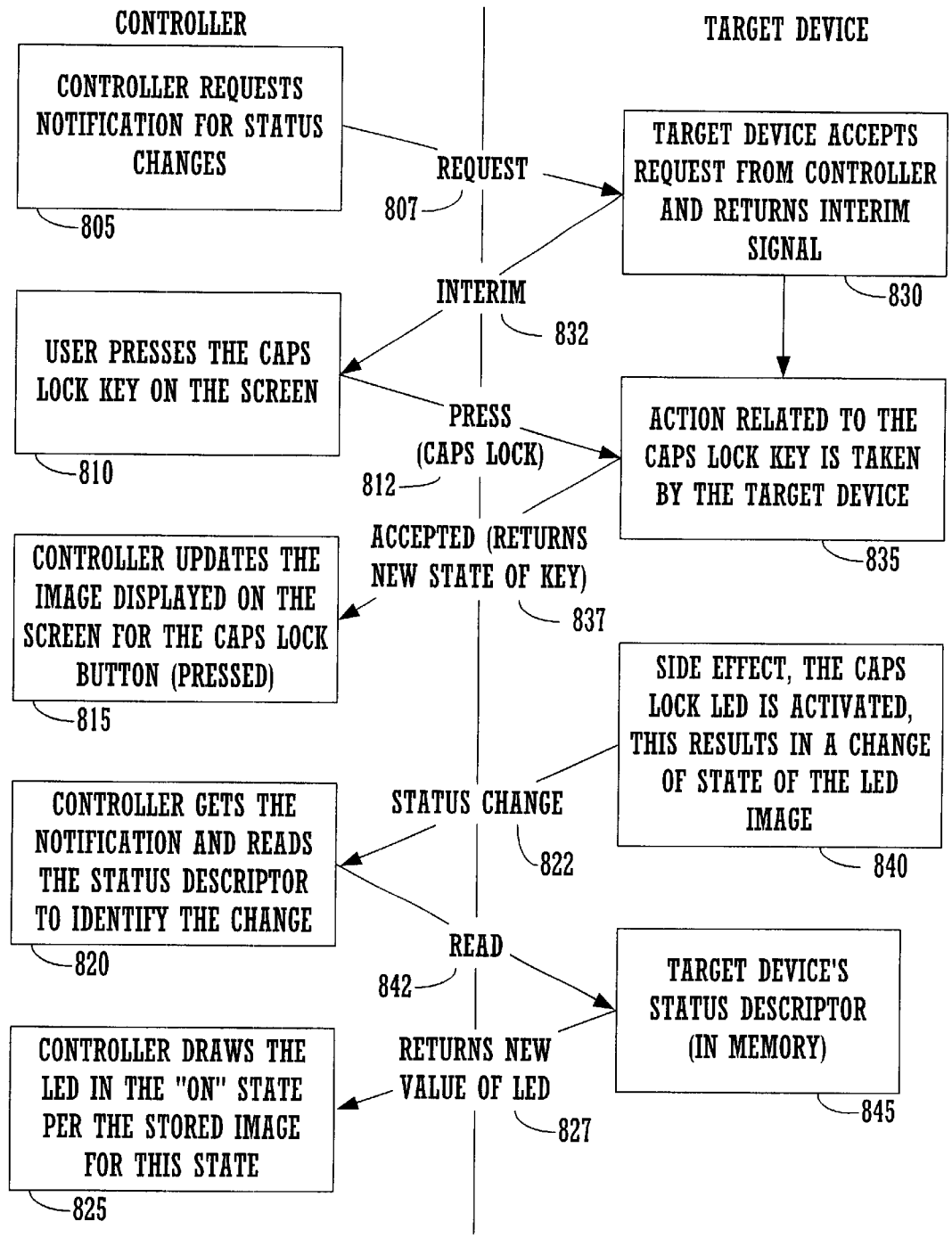
FIG. 12 illustrates exemplary steps and communications between an intelligent controller and a remote target device in accordance with the panel subunit of the present invention.

FIGS. 10–12 illustrate another example of the present invention. FIG. 10 illustrates a simulated or "virtual" keyboard 540 that can be generated for a target device using the panel subunit of the present invention. The virtual keyboard 540 can be used to control a "black box" device that itself has no physical keys or LEDs and whose control panel is purely virtual. In this case, the black box has no physical equivalent keyboard and relies on the intelligent controller for access to its functionality. In one example, the target device can be a subpanel for an intelligent television which has embedded software that requires user input, e.g., for web surfing or similar tasks.

The virtual keyboard 540 includes groups of controls where each control defines a key or an LED. Each element is represented by its own control object. The virtual keyboard 540 of FIG. 10 includes several groups. (e.g., main keys, function keys, keypad keys, etc.) with various dimensions and layouts. A first group 542 includes only the ESC key while the function keys, F1–F(n), are grouped into group 544. The standard alpha keys, the tab, caps lock, shift, control, etc., keys are grouped into group 546. The numeric keys and operator keys are grouped into group 548. Also included are a numlock LED 554, a caps lock LED 556 and a scroll lock LED 558. A power on key 560 is shown along with a special button 550 having an LED 552 therein. An LED 552 embedded in the key 550 can be modeled as an LED which can be turned on or off with the appropriate panel subunit command. Thus, a key with an LED is modeled as a hybrid control object. Group 565 includes LEDs 554, 556, 558, 552 and buttons 560 and 550.

FIG. 11 illustrates the control object descriptor information within the panel subunit needed to realize the hybrid button 550 as an example in accordance with the present invention. Fields 572–578 define a control object. Field 572 indicates that the control object is a "HYBRID" type. Field 574 indicates that two control object definitions are included in this hybrid. Field 576 is a pointer to control object 610 (control0) while field 578 points to control object 640 (control1).

With respect to control0 control object 610, field 612 indicates that the object is a "button" type and field 614 indicates the button image 614a. Field 616 indicates the button dimensions (x, y) and field 618 indicates a group identifier for group 565. Field 620 indicates the relative position of button 550 within the boundary of group 565. Field 622 indicates the range of values for the button 550 (e.g., 0 and 1). Field 624 represents the optional AV/C command, if any, corresponding to the states of button 550. Field 626 is the optional target device identification. Field 628 is the string "Special" for displays that may have only text display capability. The help string, if any, is in field 630.

With respect to control1 control object 640, field 642 of FIG. 11 indicates that the object is an "LED" type and field 644 indicates the images for the different states of the LED, e.g., green for the ON state and black for the OFF state. Field 646 indicates the LED image dimensions (x, y) and field 648 indicates a group identifier for group 565. Field 650 indicates the relative position of LED 552 within the boundary of group 565. Field 652 indicates the range of values for the button 550 (e.g., ON and OFF). Field 544 represents the optional AV/C command, if any, corresponding to the states of LED 552. Field 656 is the optional target device identification. Field 658 is the string for LED 552 for displays that may have only text display capability. The help string, if any, is in field 660 Using the examples of FIG. 11, the control objects for the remainder of FIG. 10 can be realized.

FIG. 12 illustrates steps performed by the intelligent controller and the target device, and communications there between, for interacting with the virtual keyboard 540 of FIG. 10. At step 805, the intelligent controller sends a request 807 to the target device for a notification upon any changes of the status descriptor for the virtual keyboard 540. At step 830, the target device accepts the request 807 and generates an interim signal 832 to the intelligent controller acknowledging the request 807. At step 810, the user interfaces with the virtual keyboard 540 such that the user event "PRESS" is indicated on the caps lock key of group 546. The user event "PRESS" caps lock is then transmitted 812 from the intelligent controller to step 835 of the target device.

At step 835, the target device takes any action required by this user event according to its own preset programming. The status descriptor changes and this causes a status response (e.g., to the PRESS command) to be generated by the target device. At step 835, the target device forwards a new status 837 of the caps lock key to the intelligent controller indicating that the caps lock key is now pressed. Only after receiving the new status information 837 does the intelligent controller change the image of the caps lock button on the display to indicate that it is now pressed. As a side effect of the action taken by the target device, at step 840, the state of the caps lock LED 556 changes from OFF to ON. The status descriptor changes and this causes a status update message to be generated by the target device. This change in status is reported by message 822 to the intelligent controller in response to a change in the status descriptor. The intelligent controller, in response to message 822, reads the status descriptor 845 of the target device to determine which control object changed status. At 827, it is determined and returned that the status of the LED 556 changed from OFF to ON. Only in response to receiving the new status information does the intelligent controller, at step 825, then update the image for the LED 556 from black to green to indicate the new status of ON.

It is appreciated that a direct interaction with the physical controls of the target device at step 840 can also cause a state change in the status descriptor which would then cause a notification of a status change to be forwarded to the intelligent controller. This action would also cause a change in the user interface displayed on the intelligent controller as described above The process can be repeated.

One embodiment of the present invention describes the representation of device capabilities which have some types of physical control or display, e.g., something that is user-visible and that would be manipulated by a human. However, the panel subunit of the present invention can be extended to describe how to access functionality that is "built-in" to a device but which does not have a physical external button to access it. For example, many digital set-top-boxes can contain one or more MPEG2 decoders, which contain very useful media processing functions. However, it is very unlikely that there would be an MPEG2 button on the device for the user to push. Rather, the panel subunit of the present invention can be used to define interface objects within a descriptor that represent "virtual" buttons and dials for interfacing with the MPEG2 decoder. Therefore, the capabilities of the MPEG2 decoder and the means to access its capabilities can be described using the present invention even though no physical interface elements exist on the set-top-box.

In furtherance of the above, because the panel subunit 314 of the present invention defines various types of controls and their attributes, it is possible for a "black box" device to be built which has no physical controls, but relies on its panel subunit of the present invention as its only means of being controlled (e.g., the virtual keyboard 540). Such a target device might be designed for situations where the hardware can be located in a remote or hidden location and the user control center (e.g., the intelligent controller) is at a different location. In this case, the target device would not have physical controls on its surface because they would never be used directly by a person.

Another embodiment of the present invention is drawn to the types of information or attributes that are provided by the functionality descriptors of the panel subunit. For example, the present invention describes various attributes for a button control including its physical appearance, size and shape, a text string describing the function, e.g., "play," possibly a help string describing how to use it, and some standard commands for manipulating that control, e.g., PUSH BUTTON or SET BUTTON VALUE TO 1. A variation of this functionality can add some other attributes that may be useful either in a general way or a vender-specific way.

COMMAND PASS-THROUGH MECHANISMS IN PANEL SUBUNIT

Figure 13A:
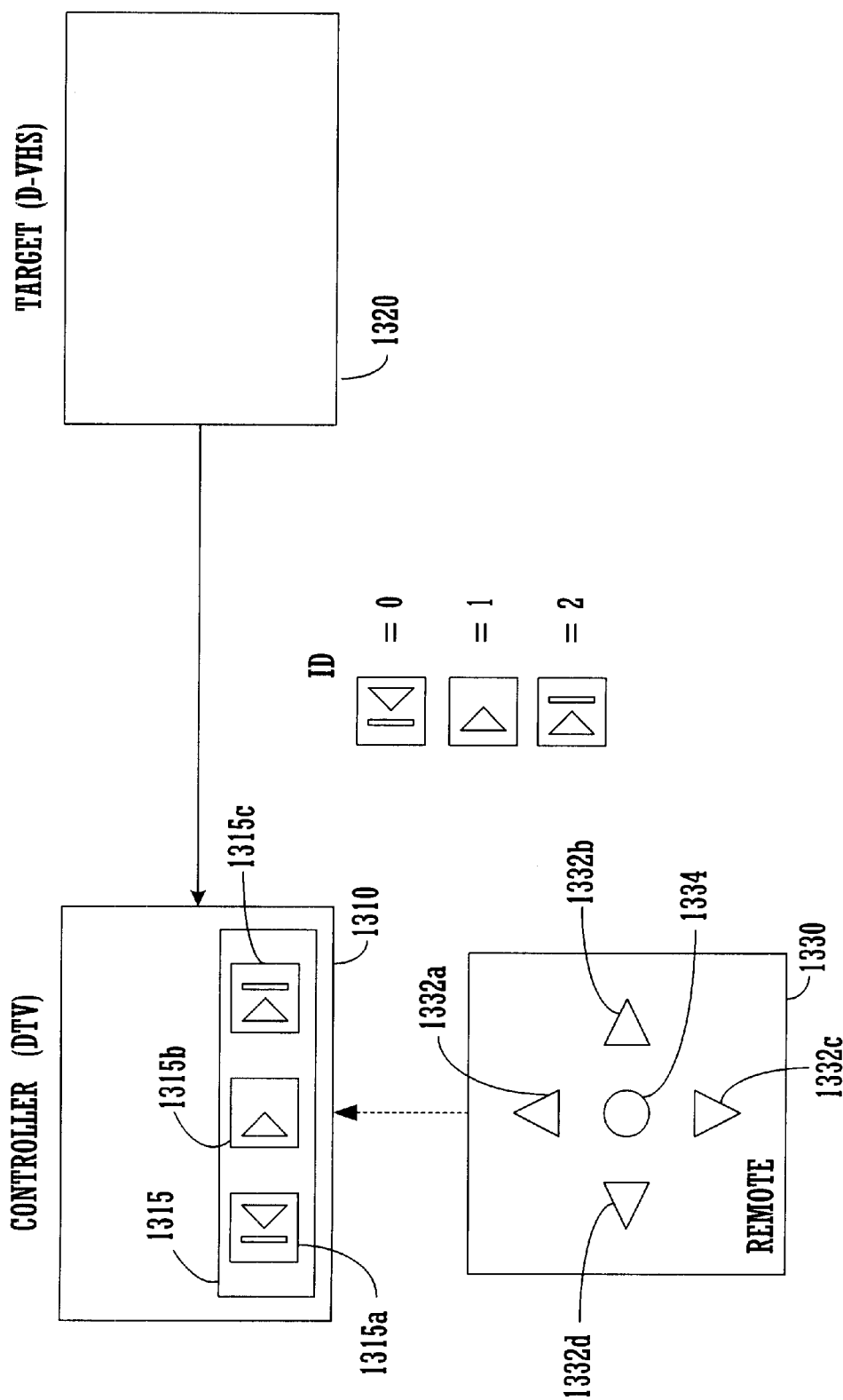
FIGS. 13A, 13B and 13C represent data flow between a controller and a target in panel subunit without using the command pass-through mechanism of the present invention.
Figure 13B:
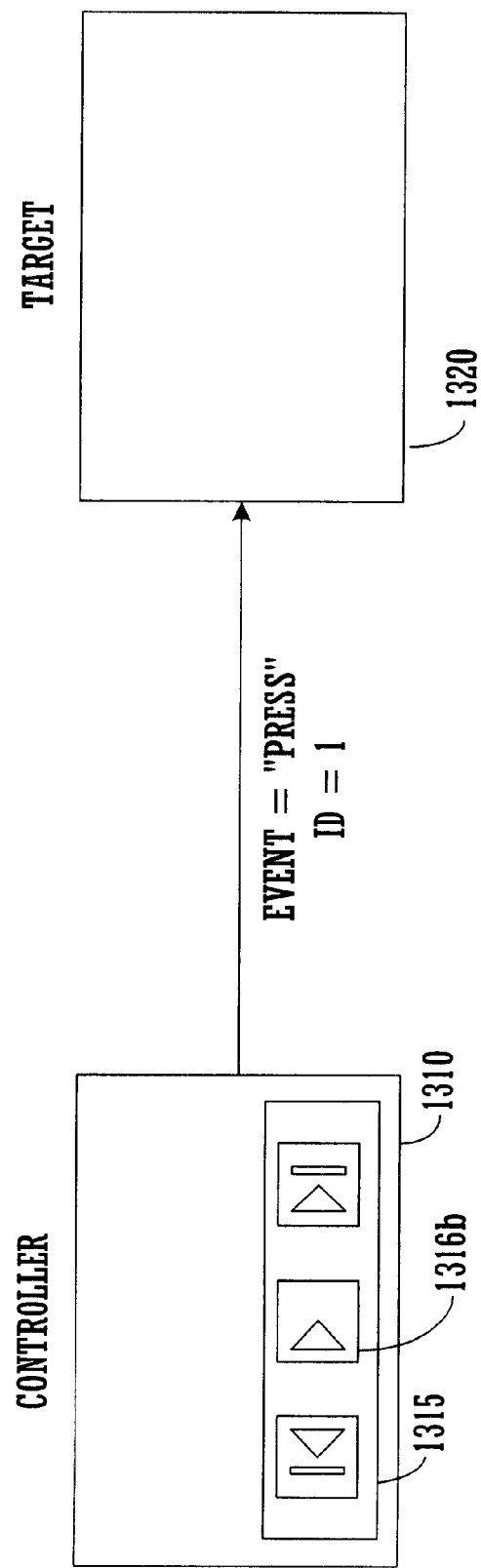
Figure 13C:
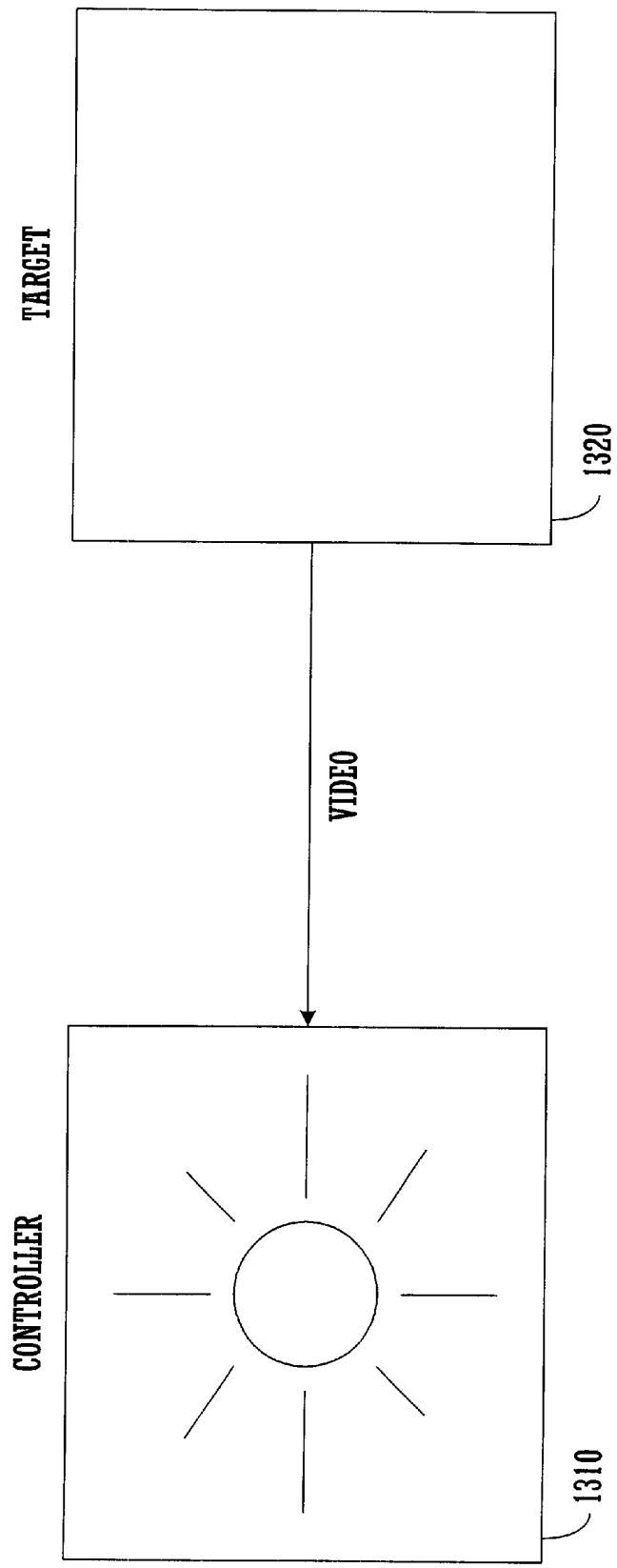

FIGS. 13A–13C illustrates operations of a controller device 1310 and a target device 1320 using the panel subunit as described above. In the illustrated example, target device 1320 is a digital video recorder (e.g., D-VHS recorder) and controller device 1310 is a digital television (DTV). Further, in the illustrated example, target device 1320 includes a remote control unit 1330 that has a "select" button 1334, a selection up button 1332a, a selection down button 1332c, a selection right button 1332b and a selection left button 1332d. Buttons 1332a–1332d are used to alter the focus of a displayed image during user navigation. Focus refers to a highlighted or otherwise distinguished screen object. When pressed, the "select" button 1334 causes a button ID to be sent to the target device.

As illustrated in FIG. 13A, a user interface 1315 for a panel subunit of target device 1320 is shown on the display of the controller device 1310. User interface 1315 includes three control objects 1316a–1316c. The functionality of the control objects 1316a–1316c and their-corresponding "button IDs" are pre-defined by a panel subunit descriptor which is retrieved from target device 1320. As illustrated, control object 1316a is assigned a button ID of 0, control object 1316b is assigned a button ID of 1 and control object 1316c is assigned a button ID of 2.

In FIG. 13B, a user moves the focus to control object 1316b by using cursor control buttons 1332a–1332d and presses the "select" button 1334 on the remote control unit 1330. In response, the controller device 1310 sends a control event PRESS together with a button ID "1" corresponding to control object 1316b to the target device 1320.

Then, as illustrated in FIG. 13C, the target device 1320 receives the button ID "1" and the control event PRESS, and responds by sending video signals to the controller device 1310.

Under the panel subunit operation model described above, even the most complicated target device can be operated by a simple remote control units (e.g., unit 1330) having only a few control keys. However, some remote control units may have special keys that do not have any corresponding "button" or "control object." In this case, the controller does not have a mechanism, under the panel subunit operation model as described above, to communicate these events to the target device.

Further, it may be cumbersome for a user to issue a simple command using the panel subunit operation methods as described above. For example, a user must navigate through graphical user interface 115 using focus navigation buttons 1332a–1332d to select the appropriate control object. However, the panel subunit architecture as described above does not provide a mechanism that allows users to communicate commands to the target device without using the graphical user interface.

In addition, under the panel subunit operation model as described above, there is no way to pass the focus navigation commands (e.g., UP/DOWN/LEFT/RIGHT) to the target device because these commands are handled within the controller device. For example, a user may press the "UP-arrow" button 1332a to shift the focus of the user interface 1315. However, the target device 1320 would not be notified of such a control event. Consequently, the target device has little control over the appearance of the user interface displayed by the controller.

Accordingly, the present invention also provides a command pass-through mechanism for allowing a set of pre-defined user command codes to be passed directly to the target device. By using the command pass-through mechanisms of the present invention, cumbersome control and manipulation of the user interface of the panel subunit can be avoided. In addition, according to an embodiment of the present invention, commands that are not represented as control objects can be communicated to the target device. Furthermore, focus navigation commands can be passed to the target device. In this way, more advanced GUIs can be created and a more seamless and intuitive operation of the target device can also be achieved.

Exemplary Use of Command Pass-through Mechanisms

Figure 16A:
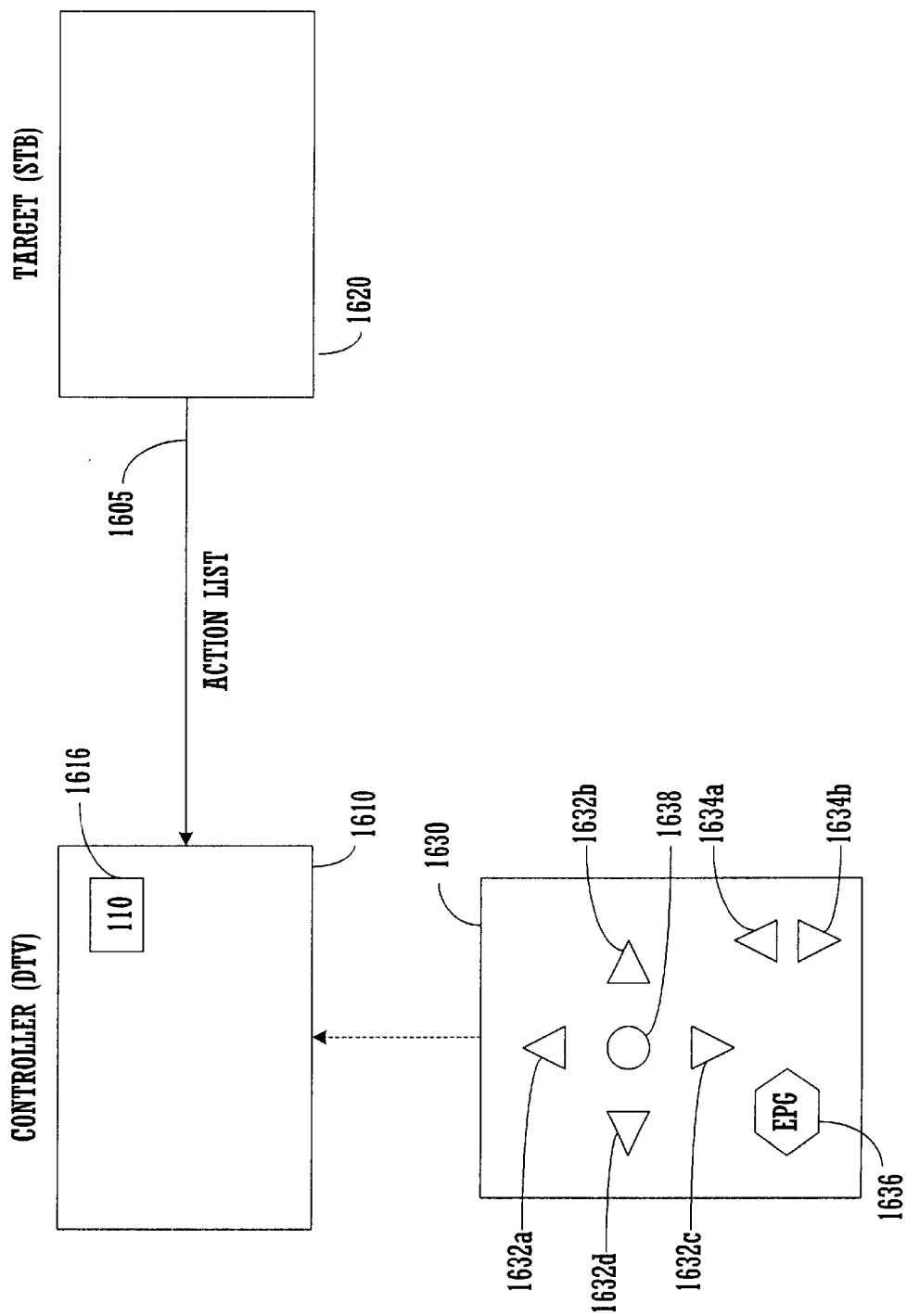
FIGS. 16A, 16B and 16C represent data flow between a controller and a target in panel subunit using an embodiment of the command pass-through mechanism of the present invention.
Figure 16B:
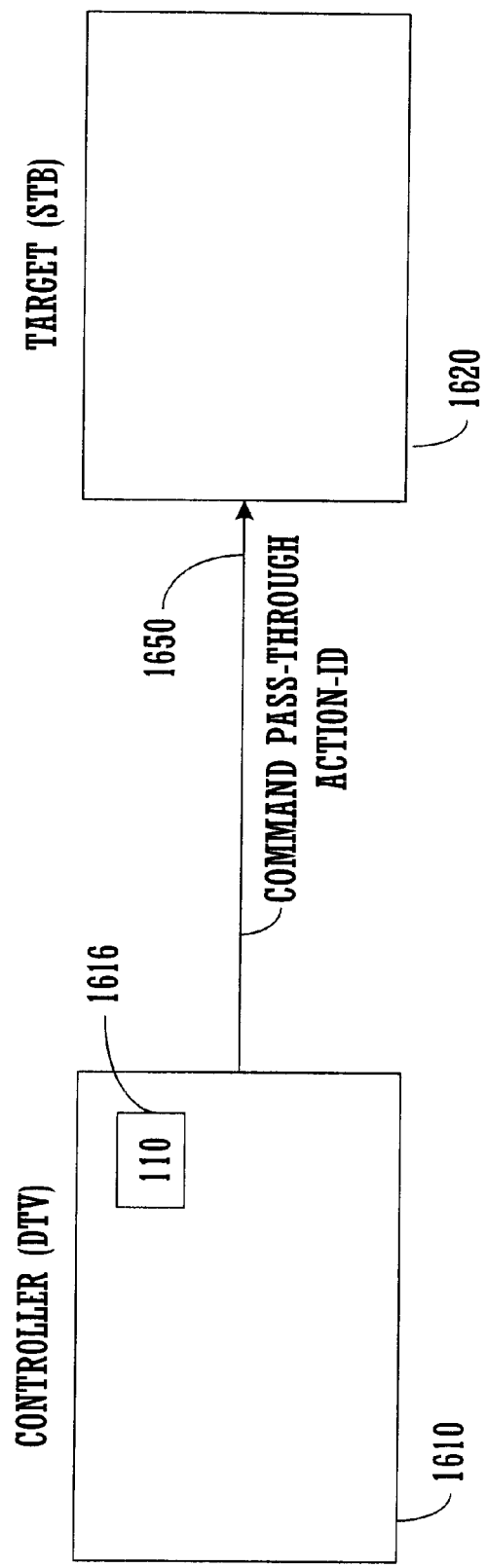
Figure 16C:
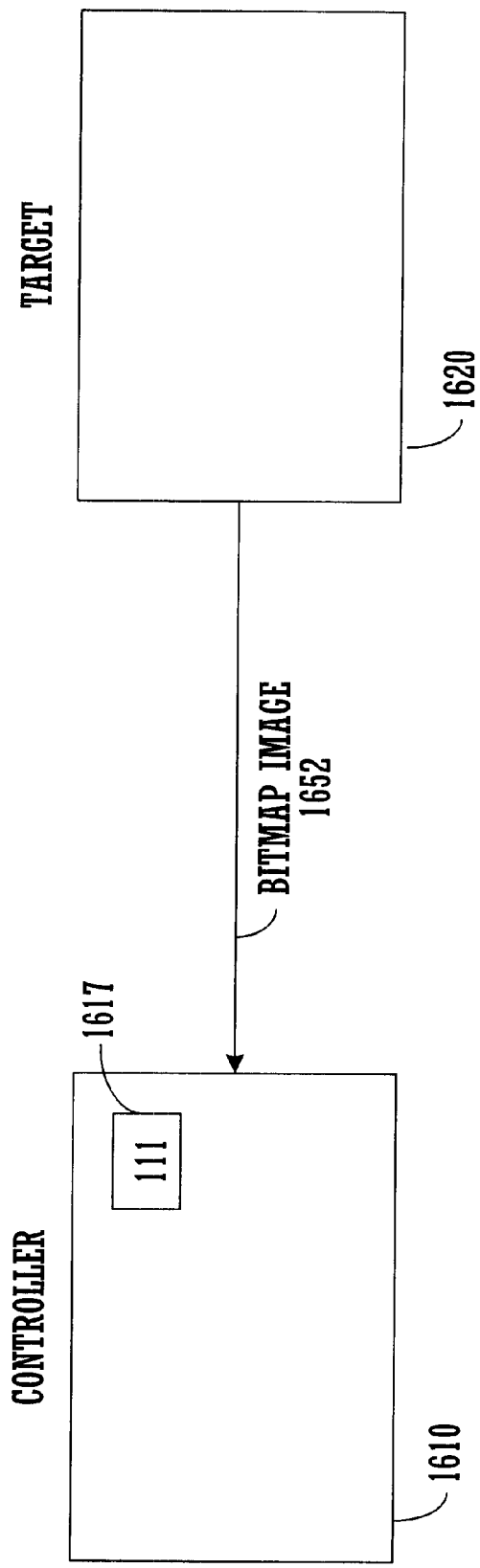

FIGS. 16A–16C illustrate, by way of examples, operations of the command pass-through mechanisms in accordance with one embodiment of the present invention. In the present example, controller device 1610 is a digital TV set (DTV) and target device 1620 is a set top box (STB). Also illustrated in FIG. 16A is a remote control unit 1630 of the controller device 1610 that includes a plurality of focus navigation buttons 1632a–1632d, a channel up button 1634a, a channel down button 1634b, an electronic program guide (EPG) button 1636, and a select button 1638. A bitmap image 1616 of a channel number "110" is also displayed by the controller unit 1610. During initialization, controller device 1610 retrieves an action list from a target device 1620 by data flow 1605. The Action list, as described more fully below, includes a list of action identifiers (action IDs) each corresponding to a function supported by the target device.

In FIG. 16B, in response to a user selecting the "Channel Up" button 1634a on remote control unit 1630, a command pass-through code is forwarded by data flow 1650 to the target device 1620 (e.g., via the 1394 asynchronous connection). An action identifier indicating that a channel up button has been pressed is also forwarded to the target device by data flow 1650. The panel subunit of the target device 1620 recognizes the command and the action identifier as a request to tune the target device 1620 to another TV channel, and causes other subunits of the target device 1620 to execute the requested action.

As shown in FIG. 16C, the target device 1620 then tunes to another channel (e.g., Channel 111). The target device 1620 also generates a bitmap image 1617 of the new channel number to be displayed on the screen of controller device 1610. Controller device 1610 then displays the bitmap image 1617 on the display.

Figure 17:
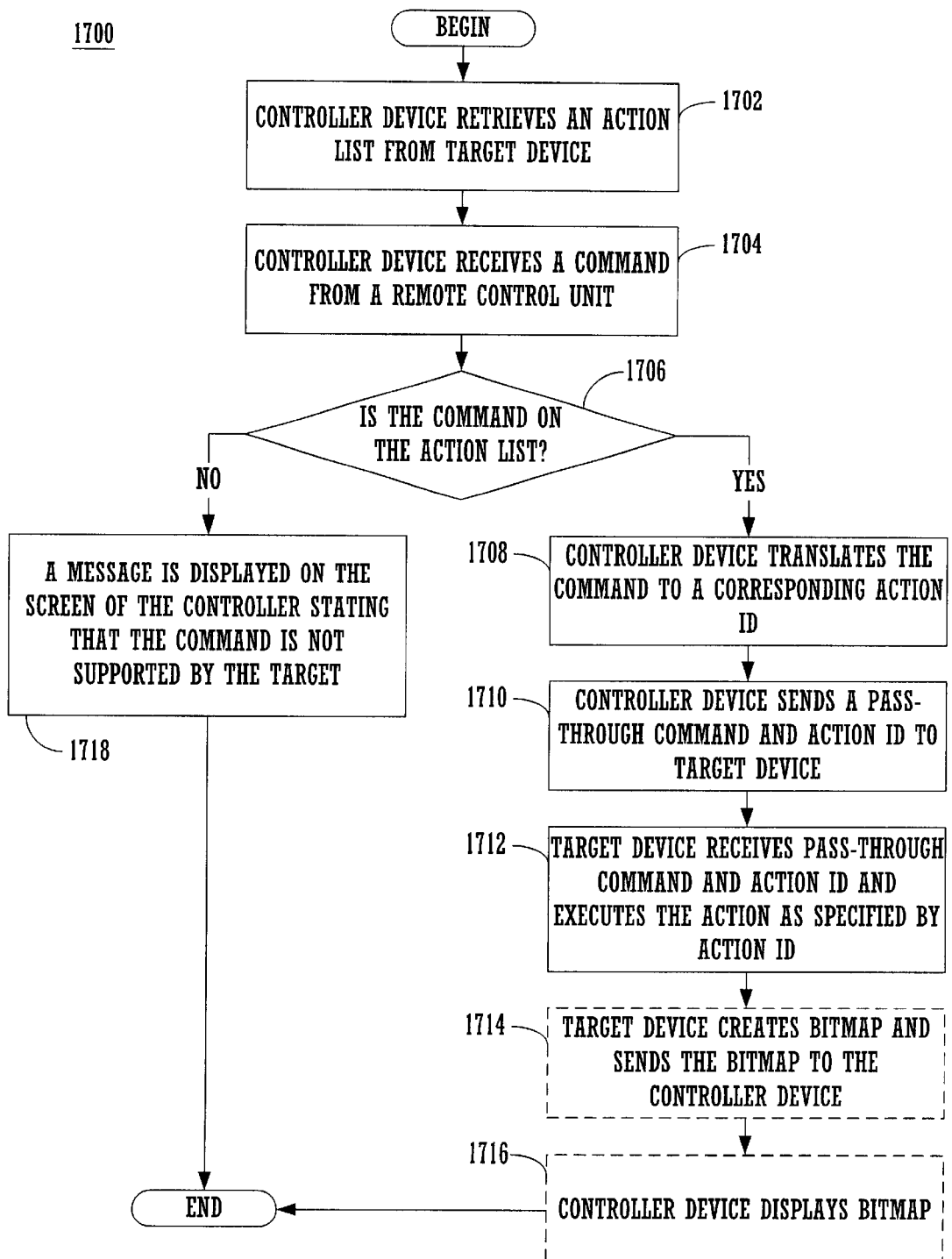
FIG. 17 is a flow diagram of a process representing an embodiment of the command pass-through mechanism of the present invention.

FIG. 17 illustrates a flow diagram 1700 of steps performed within a network of consumer electronic products for interfacing between a target device and a controller device within a network of consumer electronic products according to an embodiment of the present invention. At step 1702, the controller device (e.g., a DTV device) retrieves an action list that is stored in the panel subunit identifier descriptor of the target device (e.g., a set-top-box STB). In one implementation, the action list includes an action identifier for each function that the target supports.

At step 1704, when a user presses a key (e.g., a "Channel Up" key) on a remote of the controller device, the controller device receives the corresponding controller command and searches the action list.

At step 1706, the controller device determines whether controller command is on the action list.

If it is determined that the controller command is not on the action list, then, at step 1718, the controller command is not supported by the target device. The controller device then displays a message stating an invalid user input has been entered.

However, at step 1708, if the controller command is on the action list, the controller command is supported by the target device. The controller device then translates the controller command to a corresponding action identifier (action ID). In the present embodiment, the controller device translates the controller command according to a translation table that is embedded within the controller device.

At step 1710, the controller device sends a pass-through command together with the action identifier to the target device. In the present embodiment, the pass-through command is implemented as one of the commands within the Panel Subunit command set.

At step 1712, the target device receives the pass-through command including the action identifier, and executes the action specified by the action identifier. For example, if the action identifier indicates that the user has pressed the "Channel Up" key, then the target device will tune to the next channel, and video signals from that channel will be sent to the controller device to be displayed.

At step 1714, the target device may create a bitmap (e.g., bitmap image 1617) and transfers the image to the controller device to be displayed.

At step 1716, the controller device receives the bitmap and display on a screen of the controller device. Thereafter, the process ends. It should be appreciated that steps 1714 and steps 1716 are optional and may not be carried out if the controller command does not call for a new bitmap to be displayed by the controller device.

Figure 22:
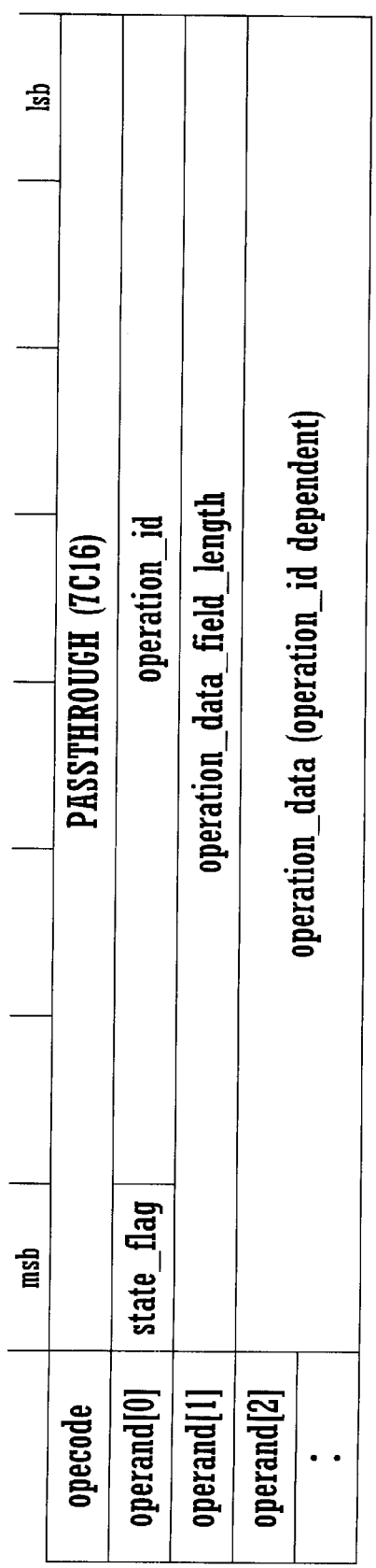
FIG. 22 illustrates a command format for the PASSTHROUGH command according to an embodiment of the present invention.

FIG. 22 illustrates the command format of the PASSTHROUGH command in accordance with one embodiment of the invention. The PASSTHROUGH command, in the present embodiment, is used to convey the proper user operation to the target transparently. In FIG. 22, the PASSTHROUGH command includes a state_flag field an "operation_id" field, an "operation_data_field_length" field, and an "operation_data" field.

Specifically, the state-flag field indicates the state of the button that is pressed by the user. For example, when a button is pressed by a user, the value of this field is zero; when released, the value is one. A controller device basically sends the PASSTHROUGH command twice, i.e. press and release, for every operation that the user performs. A command including a "pressed value" (i.e. 0) is valid for two seconds from when a target device sends back a response to the command. The controller device continues sending the pressed value with an identical operation ID value in "operation_id" field while the command is to stay valid. Either if the target device has not received the pressed command within two seconds or the target device receives the pressed command with another operation ID, then the target device considers the released command as sent but missed. To help the target device decide whether or not a button is pressed and held, the controller device may be capable of outputting the release command within 300 ms after it receives a response to the press command in case of one touch user operation. The target device is not supposed to judge the user operation to be "press or hold" within 300 ms.

The "Operation_id" field is for storing an "operation_id", or operation identifier. FIG. 23 shows an "operation_id" list that defines the correlation between operation identifiers and user operations according to the present invention. For instance, the operation_id list defines that the "UP" operation is associated with an operation_id 01, and that the "DOWN" operation is associated with the operation_id 02. In this way, the target device receiving the PASSTHROUGH command with an operation_id 01 will know that the user has issued an "UP" command (e.g., by pressing the "UP" arrow on the remote control unit). The "operation_id" list should be the same for all manufacturers such that target devices made by one manufacturer can communicate with controller devices made by another manufacturer.

The command pass-through mechanism of the present invention also allows manufacturers to implement manufacturer-specific operations. According to one embodiment, this is achieved by the "Vendor Unique" operation identifier. A controller device such as a DTV has a table indicative of which commands are "vendor unique". When a controller device receives a command that is "vendor unique" from a remote control unit, the controller device sends "Operation_data" to a target device (e.g., a VCR.) An example of the "Operation data" field format is illustrated in FIG. 24. "Operation_data" includes "company ID" and "vendor dependent information" which shows the content of the command input by a user.

When the target device receives the PASSTHROUGH command with an operation_id of 7E, the target device checks if the received "company ID" matches the one it has. If the company IDs match, the target device operates in accordance with the vendor dependent information. If those company IDs do not match, the target device does not perform the indicated operation. The target device may also send the command "Invalid command" back to the controller device so that the controller device may tell the user that the user pushed an invalid command button. In this way, unless the controller device and the target device are made by the same manufacturer, the "vendor unique" command does not function.

It is appreciated that, by using the command pass-through mechanism, the present invention provides an efficient way for a controller device to communicate with a target device without using the panel subunit graphical interface. The present embodiment can also be used in conjunction with an exact bitmap transfer mechanism, which will be discussed below.

Figure 18:
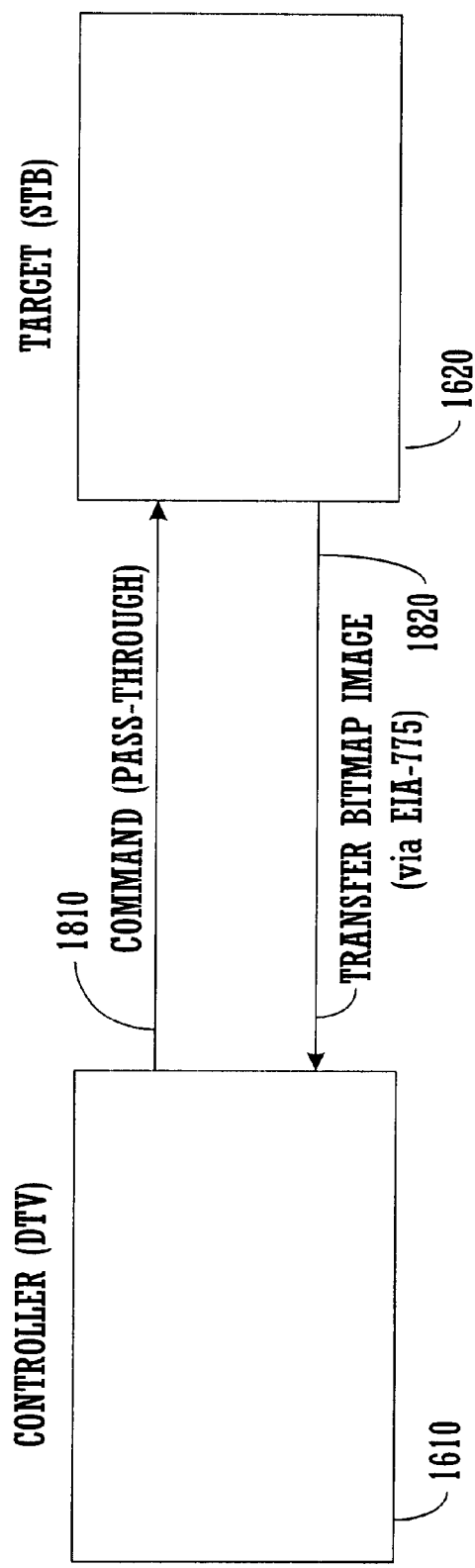
FIG. 18 represents data flow between a controller and a target in accordance with an embodiment of the present invention.
Figure 19:
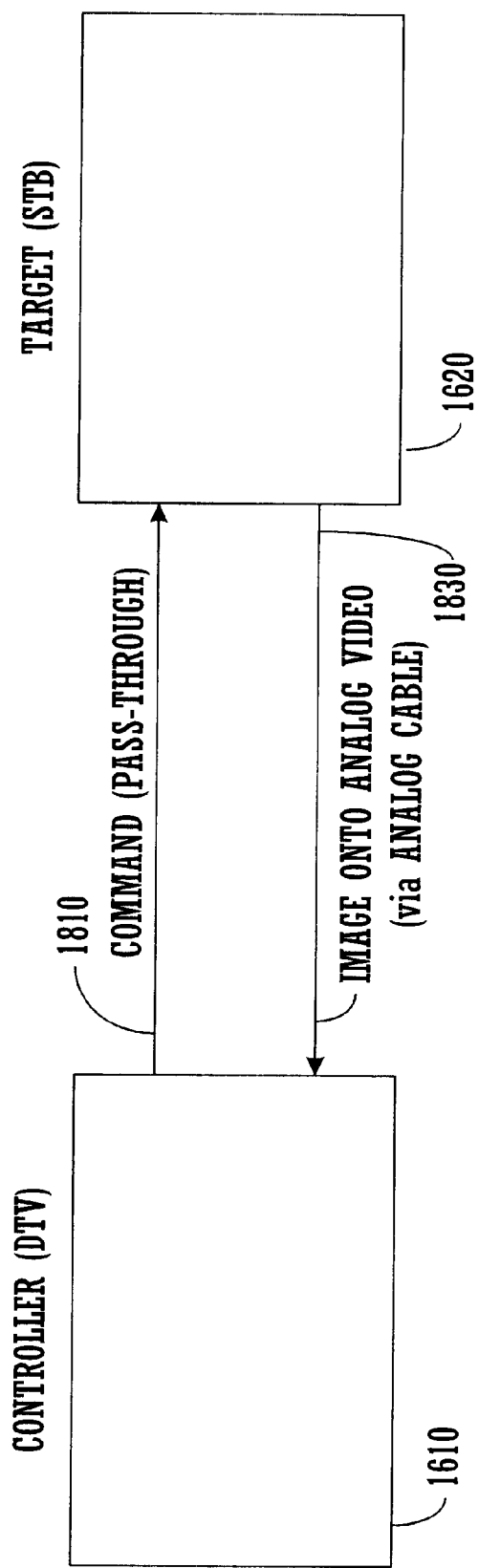
FIG. 19 represents data flow between a controller and a target in accordance with another embodiment of the present invention.
Figure 20:
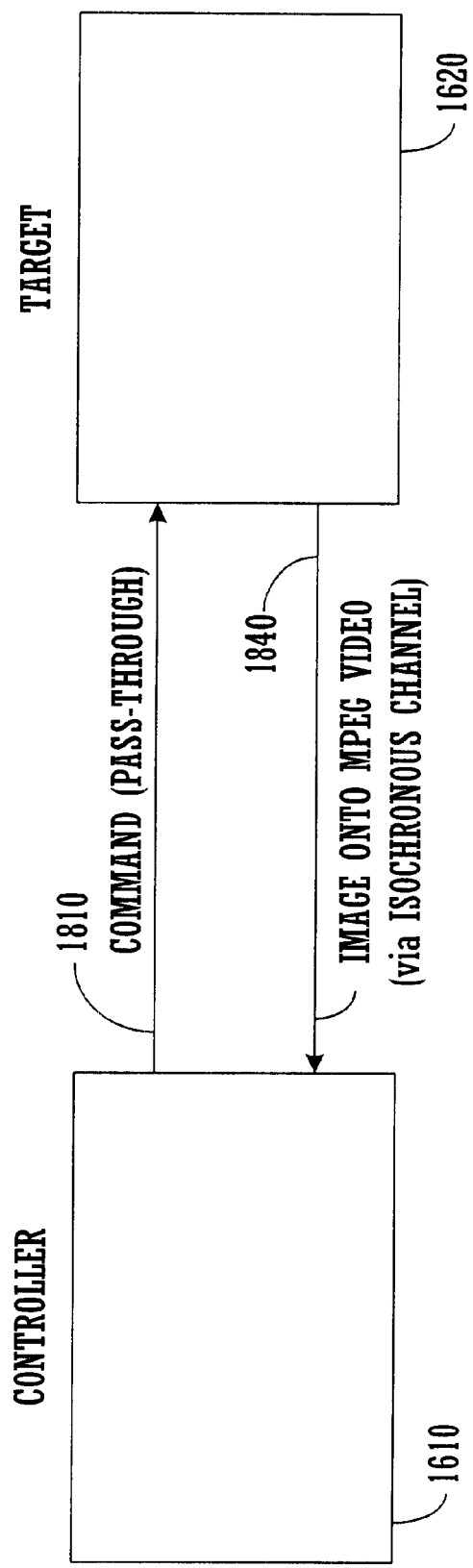
FIG. 20 represents data flow between a controller and a target in accordance with yet another embodiment of the present invention.

The present invention also provides a number of ways for sending bitmap information to the controller device. FIG. 18 illustrates one way of sending the bitmap image to be displayed on the screen of controller device 1610 according to one embodiment. As illustrated in FIG. 18, pass-through commands are sent via an IEEE 1394 connection 1810 to the target device 1620. User interface, control objects and other information generally represented by bitmaps may be sent to the controller device 1610 via an EIA-775 connection 1820. FIG. 19 illustrates another way of sending the bitmap image to be displayed. As illustrated in FIG. 19, bitmap information are added onto other video signals and are sent together via an analog cable 1830. FIG. 20 illustrates yet another way of sending the bitmap images. As shown, the bitmap image is added onto the video signals and encoded as MPEG video signals. The MPEG video signals are sent via the isochronous data channel 1840 of an IEEE 1394 connection to the controller device 1610.

Exemplary Use of Command Pass-through and Exact Image Transfer Mechanisms

Figure 21A:
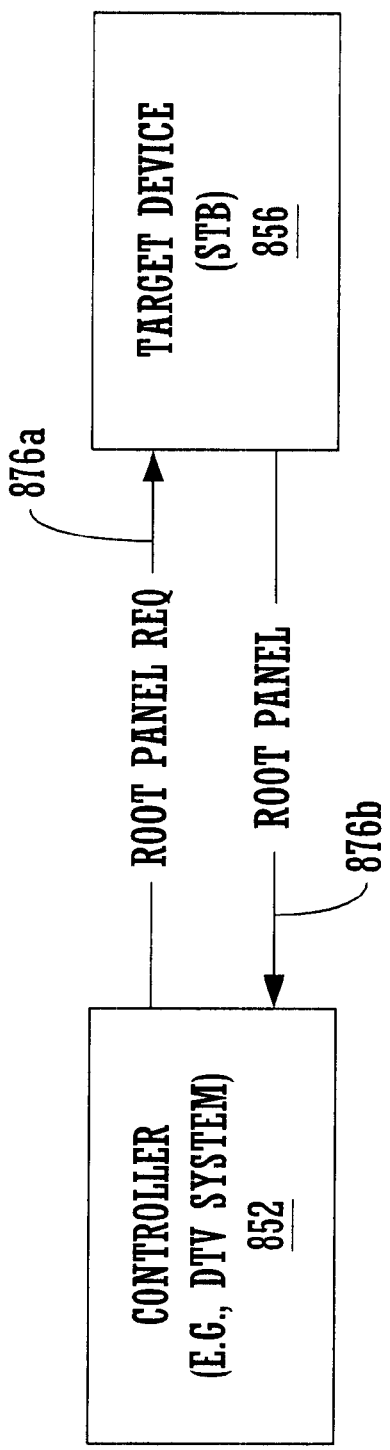
FIGS. 21A, 21B, 21C, 21D, 21E, 21F and 21G represent data flow between a controller and a target in accordance with the command pass-through mechanism and exact image transfer mechanism of the present invention.

FIGS. 21A–21G illustrate exemplary data flow between a controller device 852 and a target device 856 in accordance with another embodiment of the present invention. FIG. 21A illustrates, by data flow 876*a*, the controller device 852 requesting or reading root panel information stored within target device 856. Root panel information lists the basic capabilities of the target device 856 and may include entries for rendering panels on the controller's screen. The root panel information, by data flow 876*b*, also specifies that command pass-through is available and may include an action list that includes an action identifier for a program guide and action identifiers for cursor control buttons.

Figure 21B:
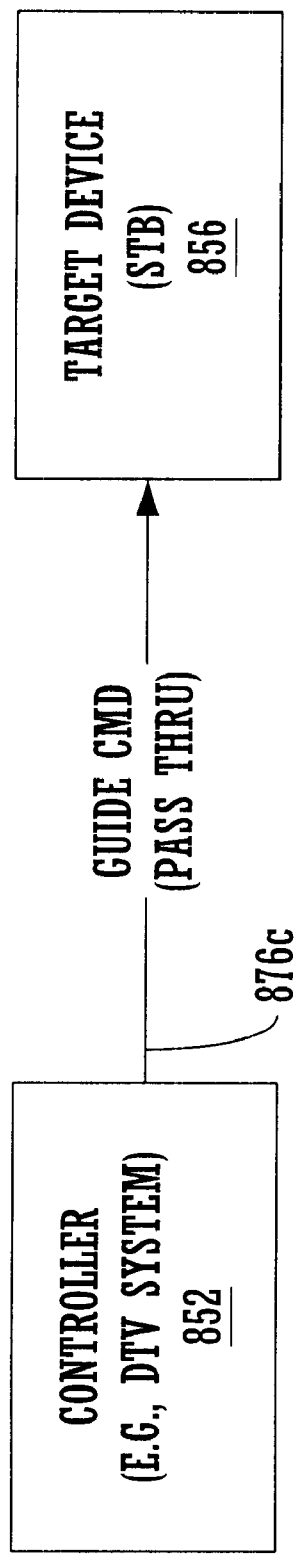

As shown by FIG. 21B, in response to a user selecting a "GUIDE" button on a remote control device, a command pass-through code 876*c* is forwarded to the target device 856 (e.g., using the 1394 asynchronous connection) which recognizes this command as a request for the display of EPG information.

Figure 21C:
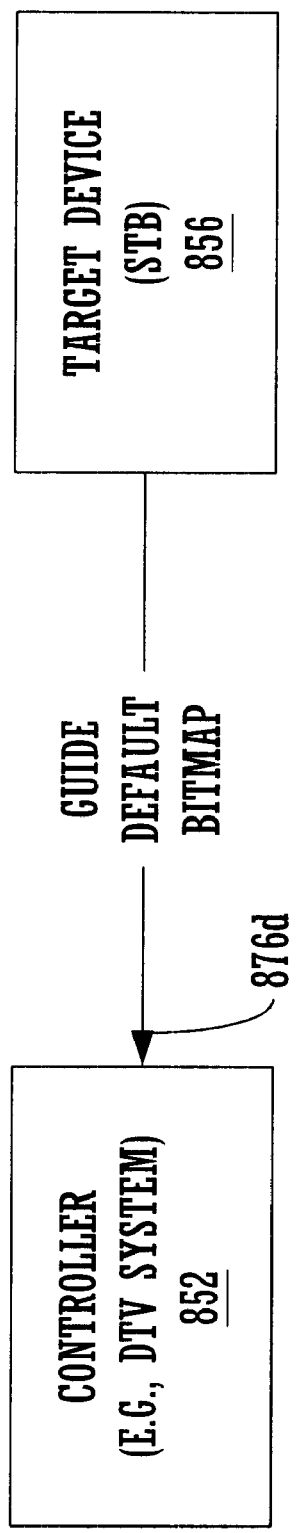

As shown in FIG. 21C, the target device 856 then, by data flow 876*d*, forwards the controller device 852 an initial bitmap image of EPG information which is displayed on a screen of the controller device 852. The initial bitmap image has a default focus selection and is shown in FIG. 25A. The default focus selection ("default focus") is 877, "National Geographic." It is appreciated that the entire matrix shown in FIG. 25A including the highlighted default selection 876 is contained in a single bitmap image that is forwarded from the target device 856 for display by the controller device 852. In this way, the arrangement of the buttons in the matrix and their appearances are guaranteed to be displayed (by the controller) in the order and with the attributes selected by the target device 856.

Figure 21D:
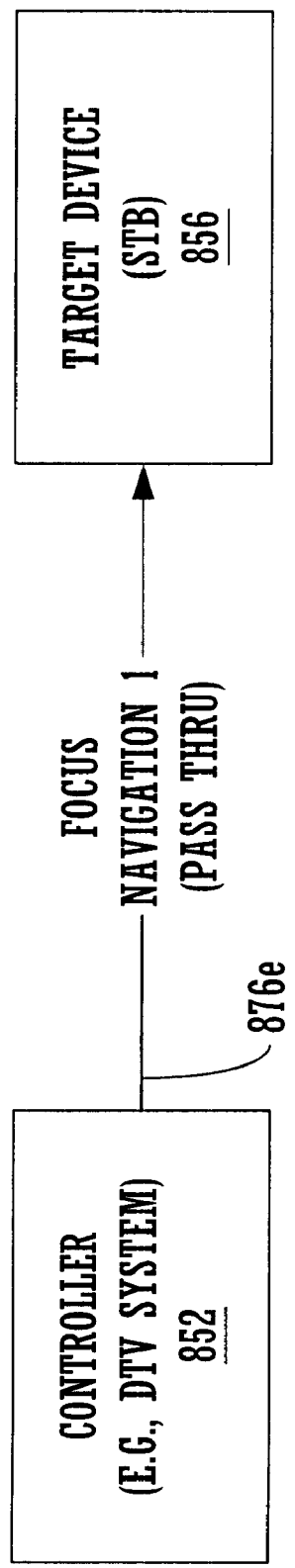

As shown in FIG. 21D, the user then selects a focus navigation change, e.g., selection of the up button of the remote control unit. This causes a pass-through command 876e to be communicated to the target device 856. In response to the focus navigation change, the target device 856 then compiles a new guide bitmap image (guide bitmap1) illustrating a new selected program, "WCW Wrestling," based on the navigation.

Figure 21E:
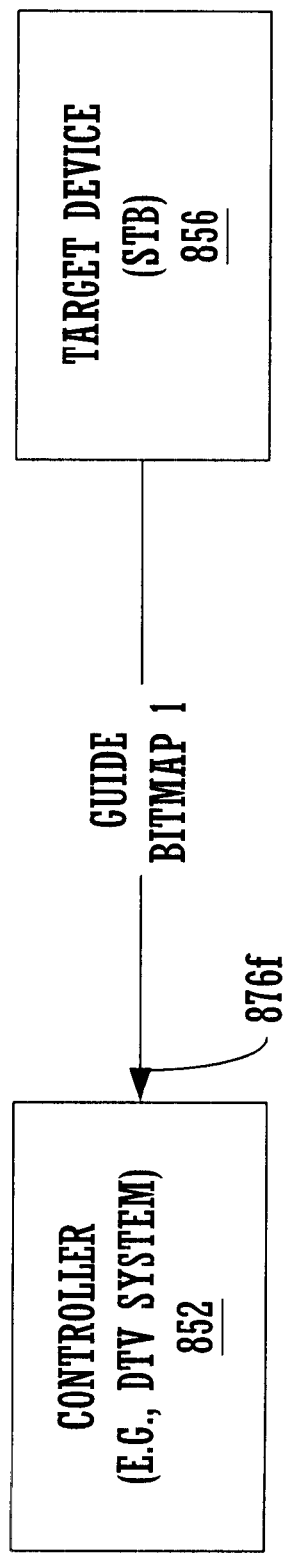
Figure 25B:
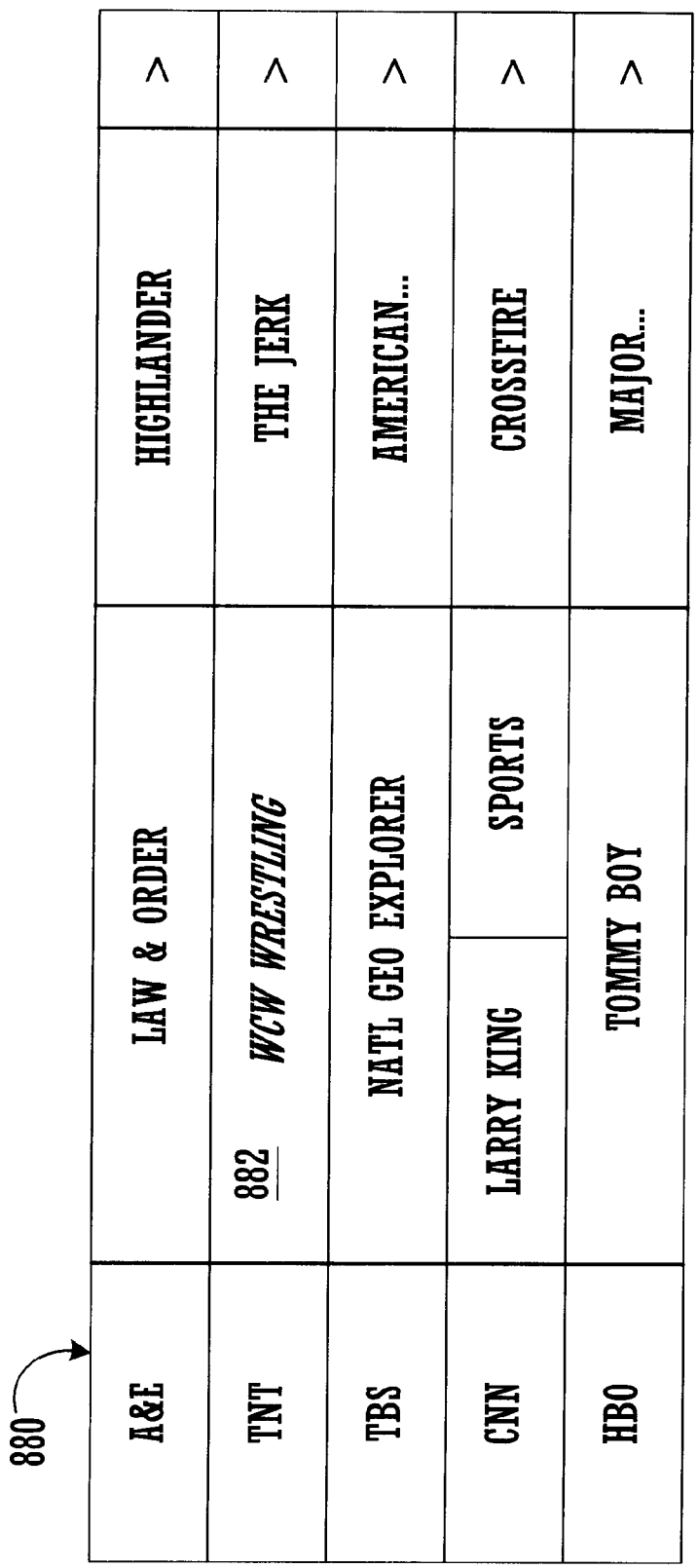

FIG. 21E illustrates that the new guide bitmap1 876f is then communicated to the controller device and displayed thereon. FIG. 25B illustrates the new guide bitmap 880 with the newly selected program or "focus" is now object 882. The entire matrix shown in FIG. 25B including the highlighted default selection 882 is contained in a single bitmap image that is forwarded from the target device 856 for display by the controller device 852.

Figure 21F:
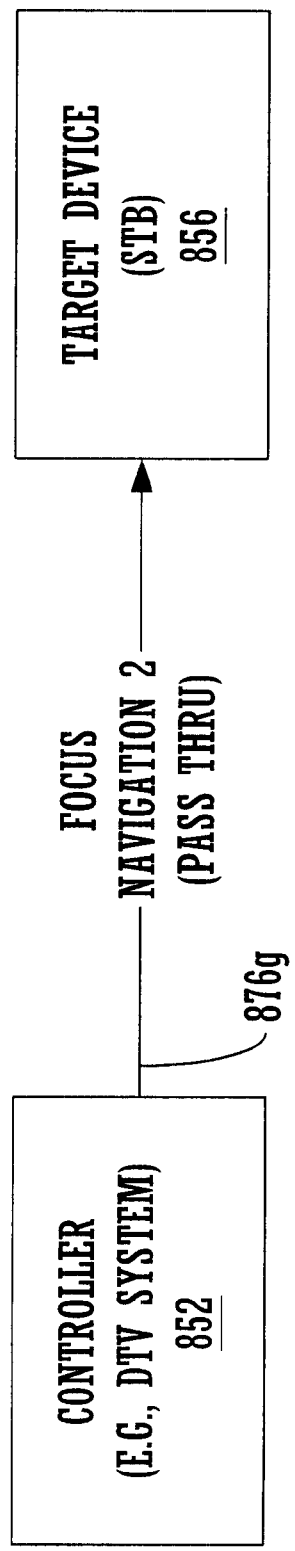
Figure 21G:
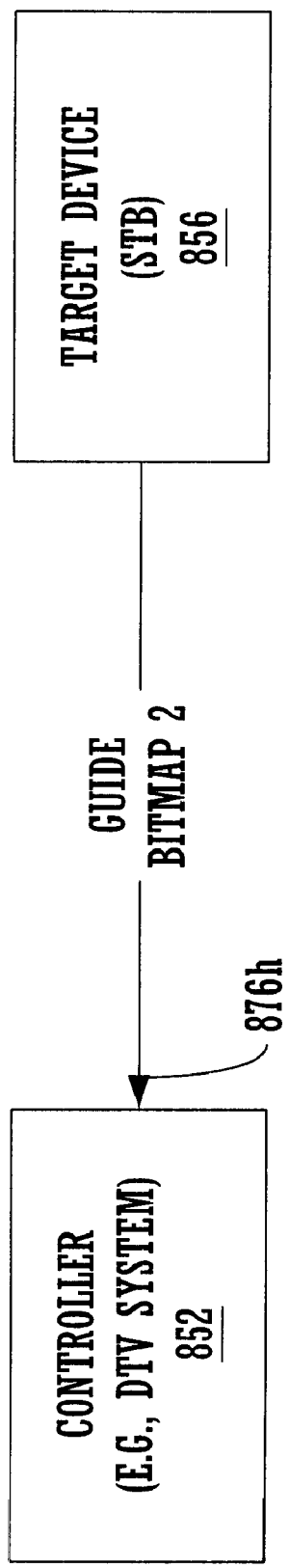

As shown in FIG. 21F, the user then selects another focus navigation change, e.g., selection of the right button of the remote control unit. This causes a pass-through command 876g to be communicated to the target device 856. In response to the focus navigation change, the target device 856 then compiles a new guide bitmap image (guide bitmap2) illustrating a new selected program, "The Jerk," based on the navigation. FIG. 21G illustrates that the new guide bitmap2 is then communicated to the controller device 852 and display thereon. FIG. 25C illustrates the new guide bitmap 884 with the newly selected program or "focus" is now object 886. It is appreciated that the entire matrix shown in FIG. 25C including the highlighted default selection 886 is contained in a single bitmap image that is forwarded from the target device 856 for display by the controller device 852.

The exact image transfer mechanism and root panel lists are described in more detail in co-pending U.S. patent application Ser. No., (TBD), entitled "A Method and System for Providing an Exact Image Transfer and a Root Panel List With the Panel Subunit Graphical User Interface Mechanism", by Shima, Suzuki and Nishimura, assigned to the present assignee and hereby incorporated by reference.

Action Lists and Root Action Lists for use with Command Pass-thropugh Mechanisms According to one embodiment of the present invention, an action list is implemented within the panel subunit. The action list contains action identifiers that represent the functionality supported by the target device. In the present embodiment, the action list constitutes a portion of the panel subunit identifier descriptor data structure. In one embodiment, the action list is read by the controller device during initialization. The controller device would then store a copy of the action list of the target device within its own memory units.

Figure 14:
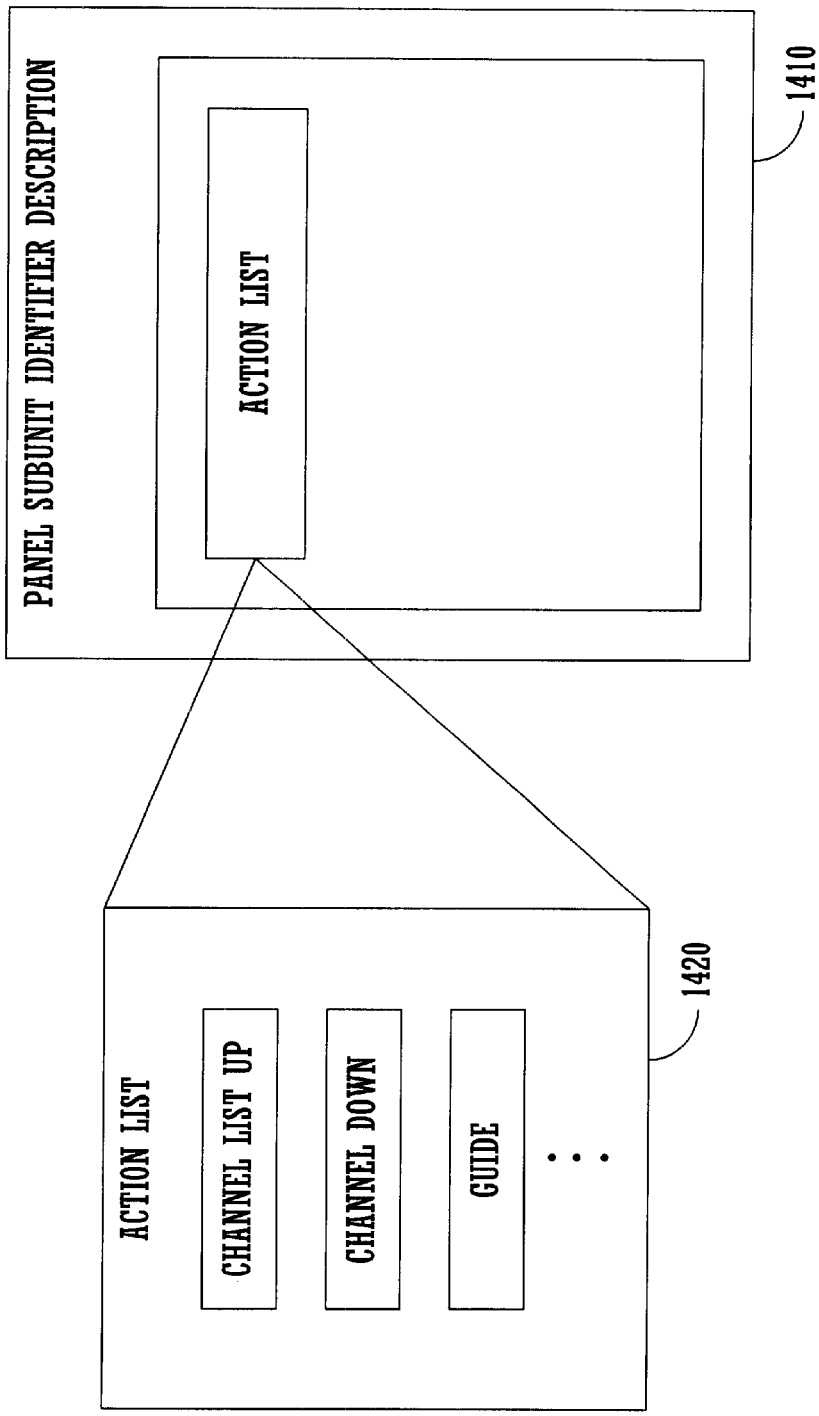
FIG. 14 is a diagram of the components of the action list embodiment of the present invention.

FIG. 14 illustrates that an action list can be implemented as an extension to a panel subunit identifier descriptor 1410. The action list 1420 contains entries each of which relates to a particular functionality supported by the target. Each entry also contains an action identifier (e.g., Channel Up, Channel Down, Guide, etc.) that corresponds to a supported function. For example, for a D-VHS digital recorder, the action list would include action identifiers corresponding to functions such as PLAY, PAUSE, REVERSE, FAST FORWARD, etc.

The controller device, once having read the action list, would then be informed of which functions are supported by the target. Thus, the controller device would be able to transmit appropriate action identifiers to the target when user control inputs are received.

Figure 15:
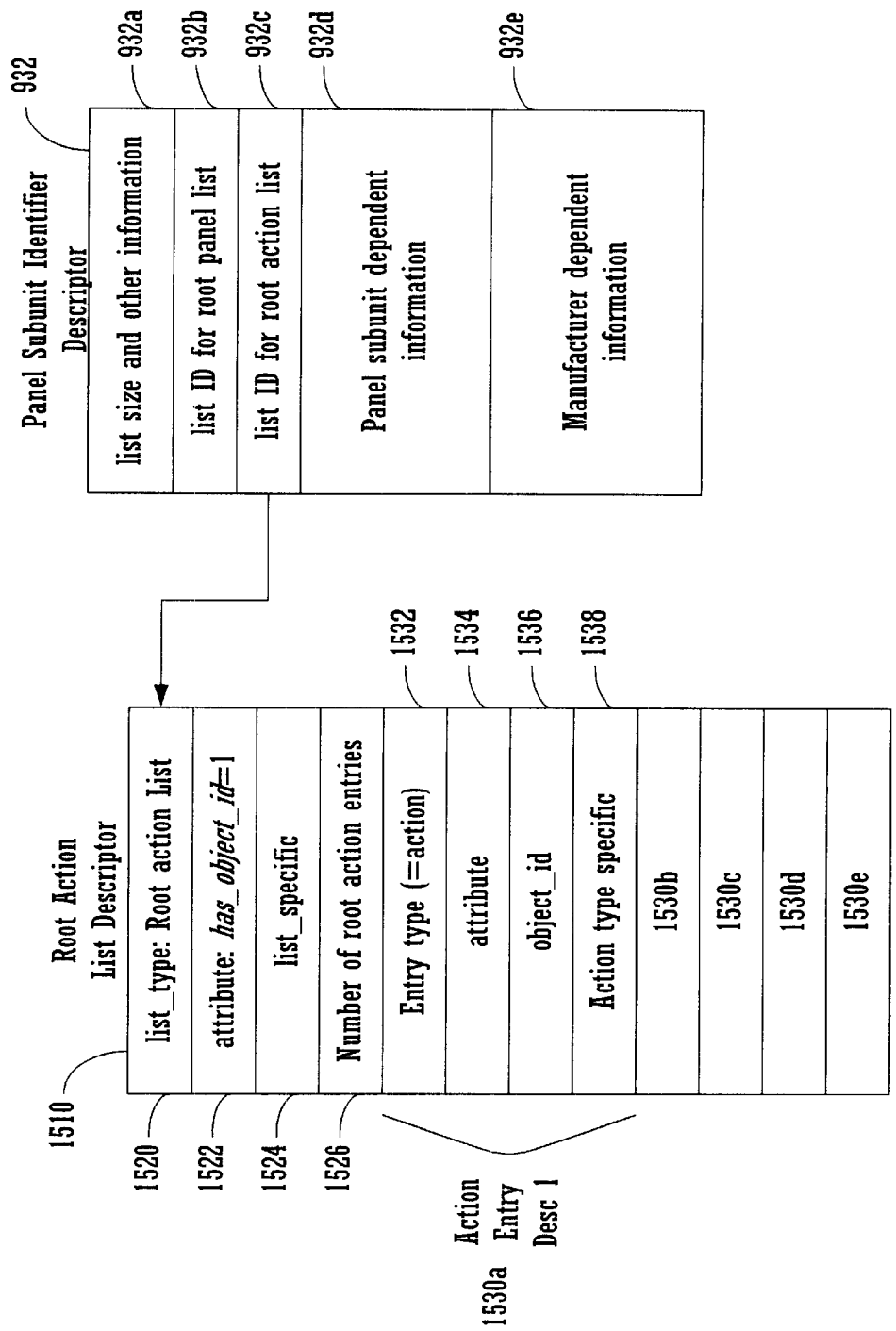
FIG. 15 illustrates the root action list descriptor in accordance with an embodiment of the present invention.

FIG. 15 illustrates a particular implementation of the root action list in accordance with the present invention. ID this example, the root action list is an extension to the panel subunit identifier descriptor 932. A panel subunit identifier descriptor 932 is shown containing entries 932a–932e. Entry 932a indicates the root action list size and other optional information. Entry 932b is a list identifier that can be used as a pointer to a root panel list descriptor.

Entry 932c is an identifier that can be used as a pointer to a root action list descriptor 1510 that includes an action list. In the present embodiment of the invention, the command pass-through mechanism can invoke the root action list and its entries. Optional entries 932d and 932e contain panel subunit dependent information and manufacturer dependent information, respectively.

Entry 1520 of the root action list descriptor 1510 contains list type information and specifically indicates that data structure 1510 is a root action list. Entry 1522 carries information regarding the display attribute information pertinent to the entire root panel display. Entry 1524 contains list specific information pertinent to the root action list descriptor 1510. List specific information 1524 may also contain command pass-through information indicating that the controller should generate the root panel display whenever a particular predefined user code is selected, e.g., from remote control device 866.

The root action list descriptor 1510 also contains a number of entries 1530a–1530e, each corresponding to a panel subunit of the target device. Entry 1526 indicates the number of these entries defined. Entry1 1530a is expanded to illustrate the definition of each entry which contains a panel type field, an attribute field and an object identifier field. Each entry contains a panel type identifier field 1532, e.g., elements, bitmap, analog, etc. This code indicates the display type of the panel. If the type of bitmap, then the corresponding panel is a bitmap image. If the type of elements,-then the corresponding panel is created using the element definitions as found in the panel subunit description. If the type is analog, then the corresponding panel is to be displayed using an analog video clip (e.g., decimated video). Other panel types can also be used. The attribute field 1534 indicates a particular display attribute to be used with the corresponding panel. Attribute information may define size information, color information, filter information, display priority information, default display characteristics, etc. Field 1536 indicates an object identifier that can be used to associate a particular pass-through command with the entry. The object identifier can also be used as a pointer for indicating where to locate the associated element definition, bitmap image or analog video store. Field 1538 contains action type specific information that is pertinent to the action entry 1530a. It is appreciated that each entry of the remainder entries 1530b–1530e also contains respective panel type, attribute and object identifier fields.

The preferred embodiment of the present invention, an command pass through mechanism for use with a panel subunit for remotely interfacing with a target device via an intelligent controller within a network of consumer electronic devices, is thus described. While the present invention has been described in particular embodiments, it should be appreciated that the present invention should not be construed as limited by such embodiments, but rather construed according to the below claims.

What is claimed is:

1. In a network of consumer electronic devices having a controller device and a target device, a method of operating said target device via said controller device, said method comprising the steps of:

said controller device receiving a user control input;

said controller device determining whether said user control input is supported by said target device by examining an action list stored within a computer readable memory unit of said controller device, wherein said action list indicates an action identifier corresponding to a function supported by a panel subunit of said target device; and provided said user control input is supported by said panel subunit, said controller device translating said user control input into said action identifier and transmitting a pass-through command in conjunction with said action identifier to said target device.

2. A method as recited in claim 1 further comprising the steps of:

said controller device accessing a panel subunit descriptor data structure stored within said target device, wherein said panel subunit descriptor data structure describes an appearance of a graphical user interface for said target device; and said controller device displaying said graphical user interface and allowing a user to control said target device by manipulating objects of said graphical user interface.

3. A method as recited in claim 1 further comprising the step of said controller device retrieving said action list from said target device during initialization of said controller device and said target device.

4. A method as recited in claim 1 further comprising the step of said target device performing said function in response to said pass-through command and said action identifier.

5. A method as recited in claim 4 wherein said performing step comprises the step of said target device transferring video images to said controller device to be displayed.

6. A method as recited in claim 5 further comprising the step of said target device transferring a bitmap image to said controller device to be displayed.

7. A method as recited in claim 1 wherein said user control input comprises a cursor control input.

8. In a network of consumer electronic devices having a controller device and a target device, a method of operating said target device via said controller device comprising the steps of:

(a) under control of said controller device, accessing a panel subunit descriptor data structure stored within said target device wherein said panel subunit descriptor data structure includes an action list that includes a plurality of action identifiers each describing a functionality of said target device;

(b) said controller device displaying a panel subunit graphical user interface based on said panel subunit descriptor data structure, wherein said graphical user interface allows a user to trigger actions on said target device by selecting objects of said graphical user interface;

(c) in response to a user control input, said controller device determining whether said user control input is supported by said target device by examining said action list; and (d) provided said user control input is supported by said target device, translating said user control input into a respective one of said plurality of action identifiers and transmitting a pass-through command in conjunction with said respective action identifier to said target device wherein said user control input is obtained without using said graphical user interface.

9. A method as recited in claim 8 wherein said panel subunit descriptor data structure defines an appearance of said panel subunit graphical user interface.

10. A method as recited in claim 9 wherein said panel subunit descriptor defines a hierarchy for elements of a control panel of said target device and defines a physical appearance and value state for each element of said control panel.

11. A method as recited in claim 8 wherein said step (a) is performed during initialization of said controller device and said target device.

12. A method as recited in claim 8 further comprising the step of said target device performing a pre-defined function in response to said pass-through command and said action identifier.

13. A method as recited in claim 12 wherein said pre-defined function further comprises said target device transferring video images to said controller device to be displayed.

14. A method as recited in claim 13 wherein said pre-defined function further comprises said target device transferring a bitmap image to said controller device to be displayed.

15. A method as recited in claim 8 wherein said user control input comprises a cursor control input.

16. A network of consumer electronic devices comprising:

a target device comprising a computer readable memory containing therein a panel subunit descriptor data structure wherein said panel subunit descriptor data structure comprises a list of action identifiers each describing a functionality of said target device;

a controller device coupled to said target device via a bus, wherein said controller device is configured for accessing said panel subunit descriptor data structure and displaying a panel subunit graphical user interface based on said panel subunit descriptor and wherein said graphical user interface allows a user to operate said target device by manipulating objects of said graphical user interface;

said controller device configured for translating said user control input into a respective one of said plurality of action identifiers and transmitting a pass-through command in conjunction with said respective action identifier to said target device such that said target device is operable via said controller device without using said panel subunit graphical user interface.

17. A network of consumer electronic devices as recited in claim 16 wherein said panel subunit descriptor data structure defines an appearance of said panel subunit graphical user interface.

18. A network of consumer electronic devices as recited in claim 17 wherein said panel subunit descriptor defines a hierarchy for elements of a control panel of said target device and defines a physical appearance and value state for each element of said control panel.

19. A network of consumer electronic devices as recited in claim 16 wherein said target device is configured for performing a pre-defined function in response to said pass-through command and said action identifier.

20. A network of consumer electronic devices as recited in claim 19 wherein said pre-defined function further comprises said target device transferring video images to said controller device to be displayed.

21. A network of consumer electronic devices as recited in claim 20 wherein said pre-defined function further comprises said target device transferring a bitmap image to said controller device to be displayed.

22. A network of consumer electronic devices as recited in claim 16 wherein said user control input comprises a cursor control input.

23. A method for controlling a target device coupled to a control device through a digital bus, comprising the steps of:
   providing a command to a control device;
   passing through said command from said control device to said target device, and;
   processing a signal in response to said command in said target device.

24. A method as recited in claim 23 wherein said digital bus is an IEEE 1394 bus.

25. A method as recited in claim 23 further comprising step of determining whether said command is supported by said target device.

26. A method as recited in claim 25 wherein said step of determining further comprises step of examining an action list stored within a computer readable memory unit of said controller device, wherein said action list indicates an action identifier corresponding to a function supported by a panel subunit of said target device.

27. A method as recited in claim 23 further comprising step of transmitting said signal to said control device.

28. A method as recited in claim 23 wherein said control device comprises a digital television.

29. A method as recited in claim 23 wherein said target device comprises a set-top box.

* * * * *